United States Patent

Hara et al.

[11] Patent Number: 5,966,549
[45] Date of Patent: Oct. 12, 1999

[54] CAMERA

[75] Inventors: Yoshihiro Hara, Kishiwada; Keiji Tamai, Suita; Tomonori Satoh, Sakai, all of Japan

[73] Assignee: Minolta Co., Ltd., Osaka, Japan

[21] Appl. No.: 09/149,595

[22] Filed: Sep. 8, 1998

[30] Foreign Application Priority Data

Sep. 9, 1997 [JP] Japan .................................. 9-244424

[51] Int. Cl.$^6$ ........................... G03B 15/03; G03B 17/00
[52] U.S. Cl. .......................... 396/54; 396/55; 396/176; 396/187
[58] Field of Search ............................. 396/52, 54, 55, 396/176, 187

[56] References Cited

U.S. PATENT DOCUMENTS

| Re. 35,583 | 8/1997 | Hamada et al. ........................ 396/55 |
| 5,084,724 | 1/1992 | Maeno ...................................... 396/52 |
| 5,598,246 | 1/1997 | Miyamoto et al. ....................... 396/55 |
| 5,640,611 | 6/1997 | Kai et al. ................................. 396/55 |
| 5,724,617 | 3/1998 | Hirano et al. ............................ 396/55 |
| 5,805,937 | 9/1998 | Kitagawa ................................. 396/55 |

Primary Examiner—W. B. Perkey
Attorney, Agent, or Firm—Sidley & Austin

[57] ABSTRACT

A camera having a substitute shake amount calculator 51e that, where flash light is emitted while integration is being performed by a shake sensor, seeks a substitute shake amount using past shake amounts stored in a memory 56 instead of the shake amount sought from the image data obtained during this integration period.

12 Claims, 19 Drawing Sheets

CAMERA

This application is based on application No. Hei 9-244424 filed in Japan, the content of which is hereby incorporated by reference.

BACKGROUND OF THE INVENTION

1. Field of the Invention

The present invention pertains to a camera that performs exposure while correcting shake of the object image due to movement of the camera relative to the object to be photographed.

2. Description of the Prior Art

In recent years, cameras have been proposed that have a function in which (i) the amount of movement of the camera relative to the object to be photographed is sought by means of a shake detection sensor that includes a CCD (charge coupled device) area sensor by repeatedly performing object image capture and comparing the positions of the sequentially obtained each object image and a standard image, and (ii) the shake of the object image is eliminated using the amount of movement thus sought.

In addition, in U.S. Reissue Pat. No. 35,583, a system is disclosed in which the data detected during electronic flash unit charging by the shake detection sensor, which includes an acceleration sensor, is not used because the electric current load increases and the voltage of the built-in power supply easily fluctuates during flash unit charging. However, considering the fact that the charging of the flash unit occurs before exposure, even if the detection data is affected by the voltage fluctuation, it does not have a direct impact on shake correction during exposure.

Moreover, where the construction is such that shake detection is prohibited at all times during the relatively long period over which the flash unit is being charged, the user have to wait until shake detection and calculations of the shake amount and estimated shake amount are completed before he can perform photo-taking using shake correction mode. This may lead to missing a photo opportunity.

On the other hand, with a camera that uses a shake detection sensor that picks up object images, accurate comparison between the picked up object image and the standard image is hindered because of the sudden change in the amount of exposure of the sensor when the flash light is used.

SUMMARY OF THE INVENTION

The object of the present invention is to obtain a camera that is capable of performing accurate shake detection or shake correction by avoiding the predicted negative effects of light emission from the electronic flash unit.

In order to attain the object described above, one aspect of the present invention has a shake detector that detects movement of the camera relative to the object, an electronic flash unit that emits flash light, and a correction device that performs shake correction based on the results of the detection by said detector, and is constructed such that the results of the detection performed by the detector during light emission by means of the flash unit are not reflected in the shake correction.

Using this construction, the predicted negative effects of light emission from the flash unit are avoided, and accurate shake detection or shake correction can be performed.

In one embodiment, detection by the detector during light emission by means of the flash unit is prohibited. Using this construction, erroneous shake detection that could occur due to the light emission is prevented.

In another embodiment, use of the results of the detection performed during light emission by means of the flash unit is prohibited from being used for shake correction. Using this construction, erroneous correction that could occur due to erroneous detection caused by the light emission can be prevented, and proper shake correction can be performed.

Yet another aspect of the present invention has a shake detector that detects movement of the camera relative to the object, an electronic flash unit that emits flash light, and a correction device that performs shake correction based on the results of the detection by the detector, and is constructed such that light emission from the electronic flash unit is delayed so that light emission will not occur during shake detection performed by the detector. r Using this construction, shake detection is performed only when the flash light is not being emitted, and proper shake detection is performed.

Yet another aspect of the present invention has a shake detector that detects movement of the camera relative to the object, an electronic flash unit that emits flash light, and a flash light emission detector that detects whether or not flash light is being emitted from the flash unit, and is constructed such that shake detection by the shake detector is prohibited while flash light is being emitted by the flash unit.

Using this construction, erroneous shake detection that could occur due to the emission of flash light is prevented.

Yet another aspect of the present invention has a shake detector that detects movement of the camera relative to the object, an electronic flash unit that emits flash light, and a flash light emission detector that detects whether or not flash light is being emitted from the flash unit, and is constructed such that the results of the detection performed during light emission from the flash unit are not used for shake correction.

Using this construction, erroneous correction that could occur due to erroneous detection caused by the flash light emission can be prevented, and proper shake correction can be performed.

Yet another aspect of the present invention has a shake detector that detects movement of the camera relative to the object, an electronic flash unit that emits flash light, and a shake detection status detector that detects whether or not shake detection is being performed by the shake detector, and is constructed such that emission of flash light by means of the electronic flash unit takes place after shake detection.

Using this construction, shake detection is performed only when the flash light is not being emitted, and proper shake detection can be performed.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

FIG. 13(a) shows the case where the taking lens faces up or down, FIG. 13(b) shows the case where the camera is in landscape orientation, and FIG. 13(c) shows the case where the camera is in portrait orientation.

DETAILED DESCRIPTION OF THE PREFERRED EMBODIMENT

Figure 1:
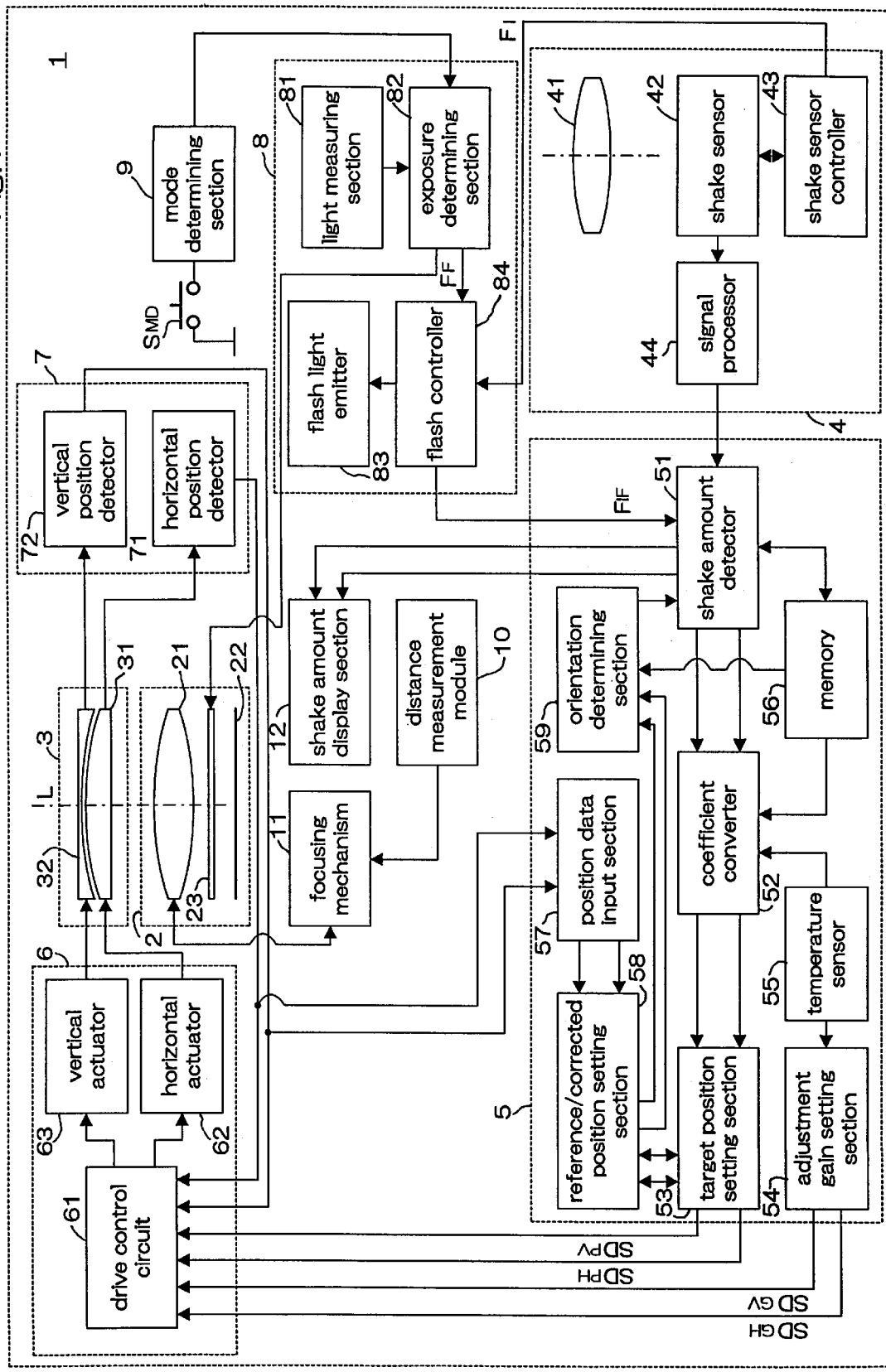
FIG. 1 is a block diagram of one embodiment of the present invention.

FIG. 1 is a block diagram of one embodiment of the present invention. The camera 1 comprises an image recording section 2, a correction lens unit 3, a shake detection section 4, a shake correction amount setting section 5, a driving section 6, a position detection section 7, an exposure control section 8, a mode determining section 9, a distance measurement module 10, a focusing mechanism 11 and a shake amount display section 12.

The image recording section 2 has a taking lens 21 having an optical axis L, a mechanism not shown in the drawing that feeds the housed film 22 to the image formation position on the optical axis L, and a shutter 23 located in front of the film 22, and performs image recording of the object image.

The correction lens unit 3 comprises a horizontal shake correction lens 31 and a vertical shake correction lens 32 located in front of the taking lens 21, and corrects for shake in the photo object image by means of refraction. The horizontal shake correction lens 31 and the vertical shake correction lens 32 each have an optical axis that is parallel to the optical axis L, and are movably supported such that they can move perpendicularly to each other along planes that are perpendicular to the optical axis L.

The shake detection section 4 comprises a detection lens 41, a shake sensor 42, a shake sensor controller 43 and a signal processor 44, and obtains image data for the detection of shake in the object image arising due to instability of the camera 1 relative to the object. The detection lens 41 has an optical axis that is parallel to the optical axis L of the taking lens 21, and forms an image of the object on the shake sensor 42 located behind it.

The shake sensor 42 is an area sensor comprising photoelectric converter elements such as CCDs aligned two dimensionally side by side. It receives the object image formed by means of the detection lens 41 and generates an electric signal corresponding to the amount of light received. This object image signal comprises a planar aggregate of pixel signals, which are electric signals generated by each photoelectric converter element after receiving light. In this embodiment, the shake sensor 42 has a brightness detection element, and when the proper electrical charge has accumulated in each CCD, the light receiving operation ends, and a signal indicating the end of this light receiving operation (hereinafter termed a 'light receiving completed signal') is returned to the shake sensor controller 43.

The shake sensor controller 43 causes the light receiving operation to be repeated by the shake sensor 42 for a prescribed period of time during which electrical charge accumulates (integration period), and sends the pixel signals obtained during the light receiving operation to the signal processor 44. It is then determined whether or not the light receiving operation is completed based on the presence of a light receiving completed signal from the shake sensor 42. Each time this signal is returned, the light receiving operation is repeated. The shake sensor controller 43 sets a flag FI, which indicates that the light receiving operation (integration period) is underway, to '1' before the light receiving operation begins, and sets it to '0' when the light receiving operation is completed. This flag FI information is sent to the flash controller 84.

The signal processor 44 carries out prescribed signal processing (such as signal amplification and offset adjustment) of the pixel signals from the shake sensor 42, and performs A/D (analog to digital) conversion of the pixel data.

Figure 2A:
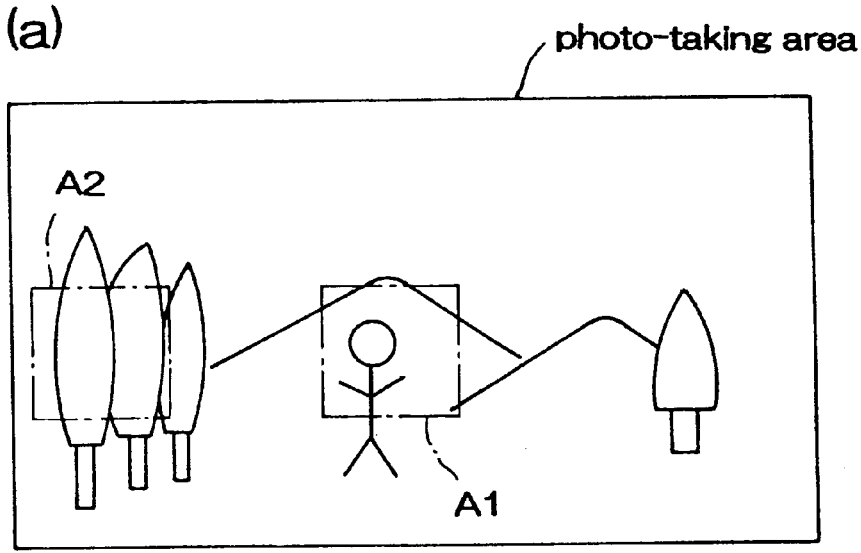
FIG. 2(a) is a drawing that shows the shake detection area when the camera is in landscape orientation.
Figure 2B:
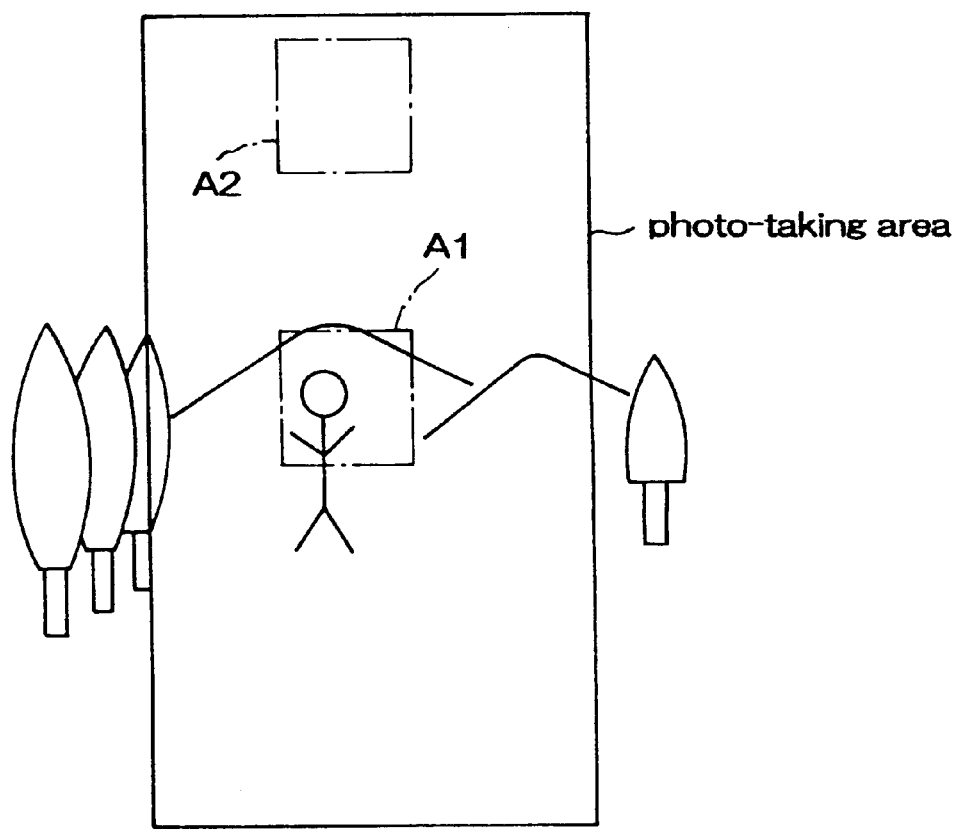
FIG. 2(b) is a drawing that shows the shake detection area when the camera is in portrait orientation.

FIGS. 2(a) and 2(b) are drawings showing examples of the shake detection areas covered by the shake detection section 4. FIG. 2(a) shows the shake detection area where the camera 1 is oriented in landscape fashion, while FIG. 2(b) shows the situation where the camera 1 is oriented in portrait fashion. In this embodiment, as shown in FIG. 2(a), the shake detection section 4 is constructed such that it covers a shake detection area A1 positioned in the center of the field of view, as well as a shake detection area A2 positioned in the surrounding area, for example to the left. In other words, of the object image formed by means of the detection lens 41, the shake sensor 42 has (i) a light receiving surface formed of light receiving elements that cover only the part of the object image corresponding to the region within the shake detection area A1 and (ii) a separate light receiving surface formed of light receiving elements that cover only the part of the object image corresponding to the region within the shake detection area A2.

The shake detection section 4 may alternatively employ a shake sensor 42 that covers the entire field of view. In this case, however, signals for areas equivalent to detection areas A1 and A2 should be separated and extracted during image processing.

The shake correction amount setting section 5 comprises the shake amount detector 51, a coefficient converter 52, a target position setting section 53, an adjustment gain setting section 54, a temperature sensor 55, a memory 56, a position data input section 57, a reference/corrected position setting section 58 and an orientation determining section 59. It sets data for the driving section 6 to generate a drive signal. The temperature sensor 55 detects the ambient temperature around the camera 1. The memory 56 comprises a RAM that temporarily stores data used by the shake amount detector 51, such as image data and shake amount data, and an EEPROM that stores conversion coefficients used by the coefficient converter 52 and orientation information regarding the camera 1 corresponding to difference data used by the orientation determining section 59.

Figure 3:
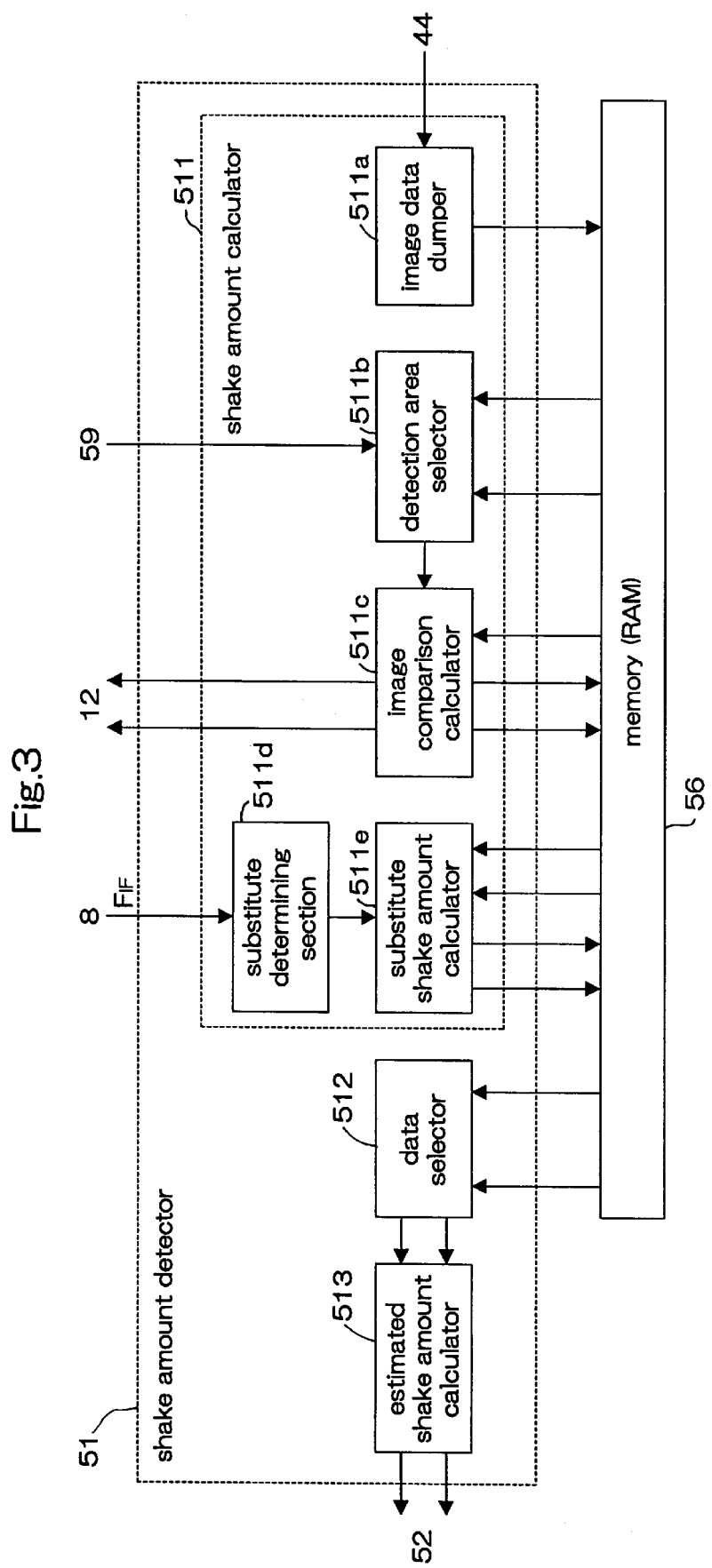
FIG. 3 is a block diagram of the shake amount detector.

FIG. 3 is a block diagram of the shake amount detector 51. The shake amount detector 51 comprises the shake amount calculator 511, a data selector 512 and an estimated shake amount calculator 513. It seeks the shake amount using image data from the signal processor 44 and further seeks the estimated shake amount using this shake amount.

The shake amount calculator 511 comprises an image data dumper 511a, a detection area selector 511b, an image comparison calculator 511c, a substitute determining section 511d, and a substitute shake amount calculator 511e. The image data dumper 511a dumps the image data from the signal processor 44 into the memory 56 (RAM). The image data regarding shake detection areas A1 and A2 is stored in the memory 56.

The detection area selector 511b selects one of the shake detection areas A1 or A2, and the image comparison calculator 511c calculates the shake amount using the image data for the selected area. In this embodiment, the detection area selector 511b selects one of the shake detection areas A1 or A2 in response to camera orientation information from the orientation determining section 59 described below, which indicates whether the camera is in landscape orientation or portrait orientation.

Where the camera orientation information indicates that the camera is in landscape orientation, the detection area selector 511b first reads out from the memory 56 the image data for the shake detection area A1 and compares the contrast value CA1 for this image data with a prescribed value Ca. If CA1 is higher than Ca, the detection area selector 511b selects the shake detection area A1, but if not, it selects the shake detection area A2. This is because if the camera is in portrait orientation, as shown in FIG. 2(b), it is highly likely that there will be sky or ground unrelated to the main object contained in the shake detection area A2, but there is a high probability that the shake detection area A1 will contain the main object. On the other hand, where the camera is in landscape orientation, the detection area selector 511b reads out from the memory 56 the image data for the shake detection areas A1 and A2, compares the contrast values $C_{A1}$ and $C_{A2}$ for the images of the two areas, and selects the area having the higher contrast value. This is because where the camera is in landscape orientation, it is possible that the main object may exist in both areas to the same degree. It does not matter whether the contrast values used for the purpose described above are the maximum contrast value or the average contrast value.

The image comparison calculator 511c uses the image data regarding the shake detection area selected by the detection area selector 511b to seek the shake amount. It extracts an image corresponding to the standard image from the latest image data stored in the memory 56 as a reference image, and seeks the shake amount expressed in terms of the number of pixels from the amount of change in the position of the reference image relative to the position of the standard image. The shake amount is sought for both the horizontal and vertical directions. The horizontal and vertical shake amounts thus obtained are then temporarily stored in the memory 56.

Figure 4:
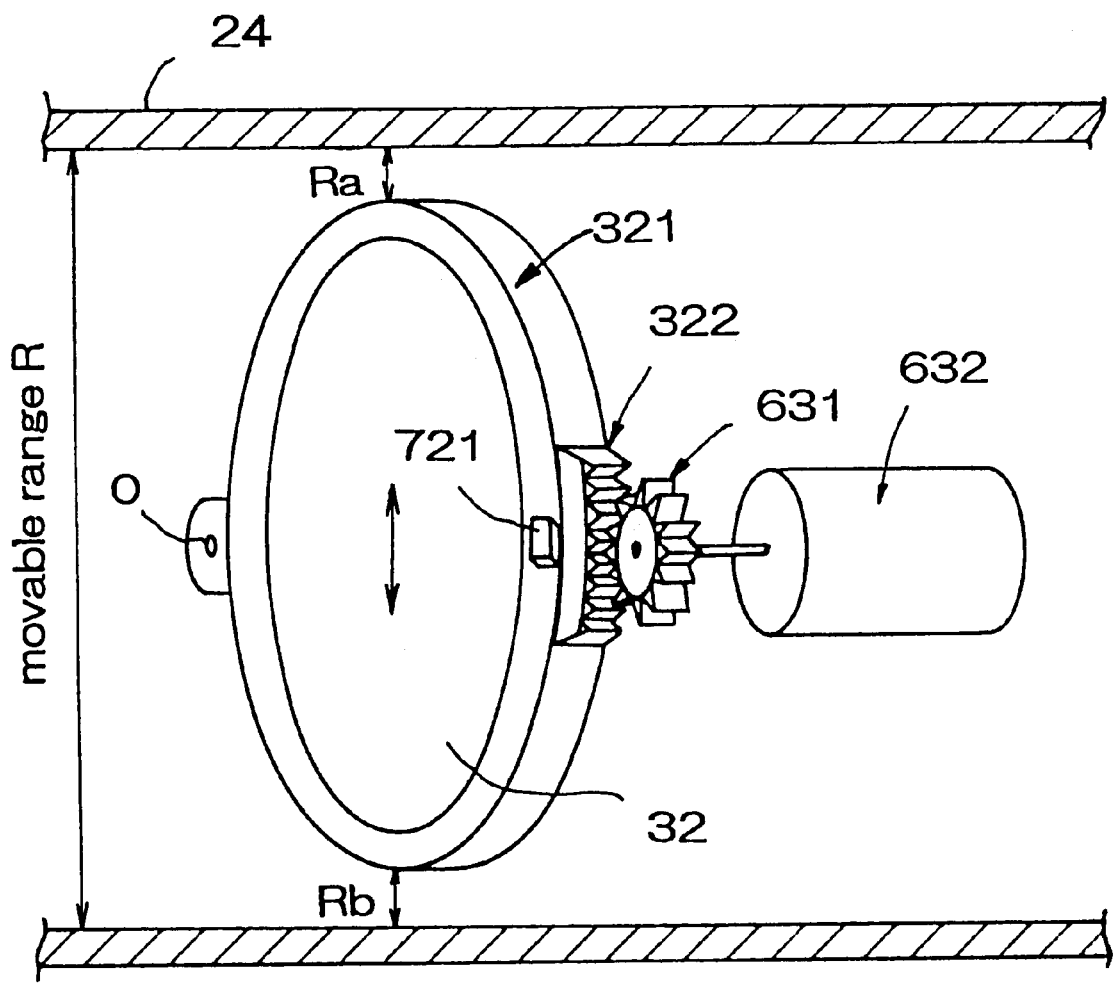
FIG. 4 is a perspective view of a vertical shake correction lens housed inside a lens barrel.

FIG. 4 is a perspective view of a mechanism including the vertical shake correction lens 32 housed in the lens barrel. In this embodiment, the vertical shake correction lens 32 is housed inside a lens barrel 24, and is connected to a frame 321 rotatably supported around a fulcrum 0. A gear 322 is formed on the outer part of the frame 321 on the side opposite from the fulcrum 0. When a motor 632 having a gear 631 that engages with this gear 322 is driven, the vertical shake correction lens 32 moves essentially vertically. As can be understood from FIG. 4, the vertical shake correction lens 32 can move essentially vertically within the movable range R, which comprises the inner diameter of the lens barrel 24. The same mechanism is also present for the horizontal shake correction lens.

The standard image used by the image comparison calculator 511c will now be explained with reference to FIG. 4. A standard image is an image that is included in the image data taken from the shake detection section 4 when the lenses of the correction lens unit 3 are set at prescribed standard positions, i.e., when the lenses are set at positions at which each of them has an equal distance over which it can travel in either direction in its respective movable range, or is centered (in FIG. 4, this is a position at which Ra equals Rb). By having the position at which the lenses are centered be the standard position, the problem that the lens comes to the end of the movable range quickly when one distance is shorter than the other can be avoided.

The substitute determining section 511d shown in FIG. 3 uses the flag $F_{IF}$ from a flash controller 54 described below to determine whether or not the flash unit has emitted light during the integration period. Where it has, (if the flag $F_{IF}$='1'), it sets the substitute shake amount calculator 511e to operate.

The substitute shake amount calculator 511e seeks, in response to the setting performed by the substitute determining section 511d, a substitute shake amount based on past shake amounts stored in the memory 56 instead of the shake amount sought from the image data obtained during the integration period during which flash light was emitted.

Figure 5:
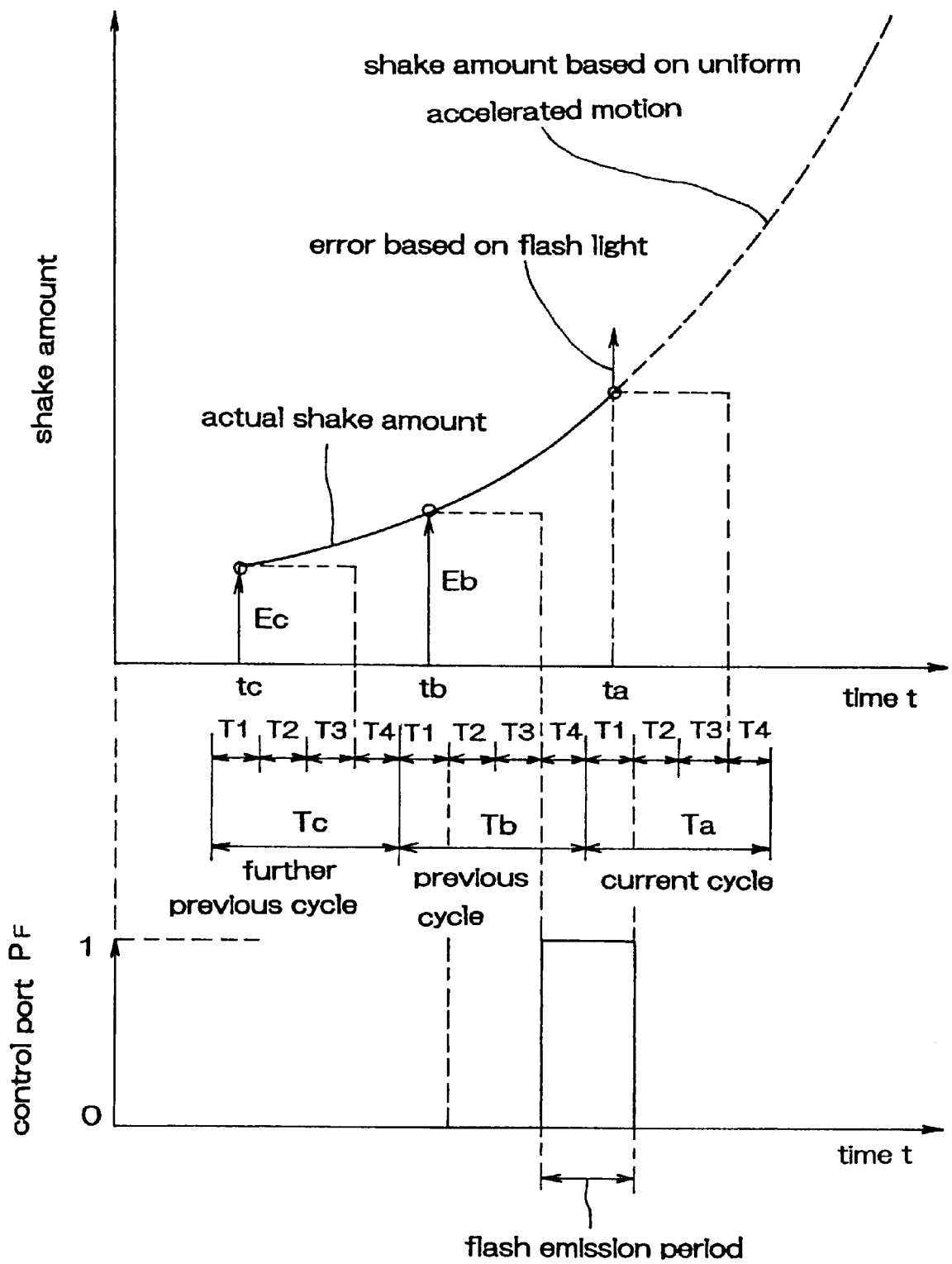
FIG. 5 is a drawing to explain the operation of a substitute shake amount calculator.

FIG. 5 is a drawing to explain the operation of the substitute shake amount calculator 511e. In FIG. 5, time T1 is the integration period required for the shake sensor 42, time T2 is a period of time required for the image information from the shake sensor 42 to be dumped in the memory 56, time T3 is a period of time required to calculate the shake amount, and time T4 is a period of time required to calculate an estimated shake amount. Time points (ta), (tb) and (tc) each indicate the midpoint of their corresponding integration period T1, and the time elapses in the direction from (tc) to (ta).

In the example of FIG. 5, flash light was not emitted during the integration period T1 in the previous cycle Tb or the further previous cycle TC. Conversely, flash light was emitted during the integration period T1 in the current cycle Ta. When flash light is emitted during the integration period T1 in this way, the object image obtained from the shake sensor 42 becomes bright due to the flash light and its size changes. Consequently, the problem arises that the shake amount obtained through image comparison changes significantly, that is, shake amount detection error arises.

The substitute shake amount calculator 511e therefore calculates a substitute shake amount Ea' for current cycle Ta via the calculation set forth in equation (1) using shake amounts Eb and Ec actually detected at times tb and tc.

$$Ea'=Eb+(Eb-Ec)\times Ta/Tb \qquad (1)$$

A substitute shake amount Ea' is sought for both the horizontal and vertical directions. Both the horizontal and vertical substitute shake amounts thus sought are temporarily stored in the memory 56 in place of horizontal and vertical shake amounts Ea (which includes the 'error due to flash light' shown in FIG. 5) derived by means of the image comparison calculator 511c. Where the shake detection error is somewhat large, or where the shake amount has actually changed considerably, it is acceptable if past shake amounts are averaged and a substitute shake amount is sought using the averaged data. Moreover, this method is not limited to the use of equation (1). It is acceptable if a method is adopted in which an estimated substitute shake amount at the time point ta, for example, is calculated in the same way as that used in connection with the estimated shake amount calculator 513 described below.

Figure 6:
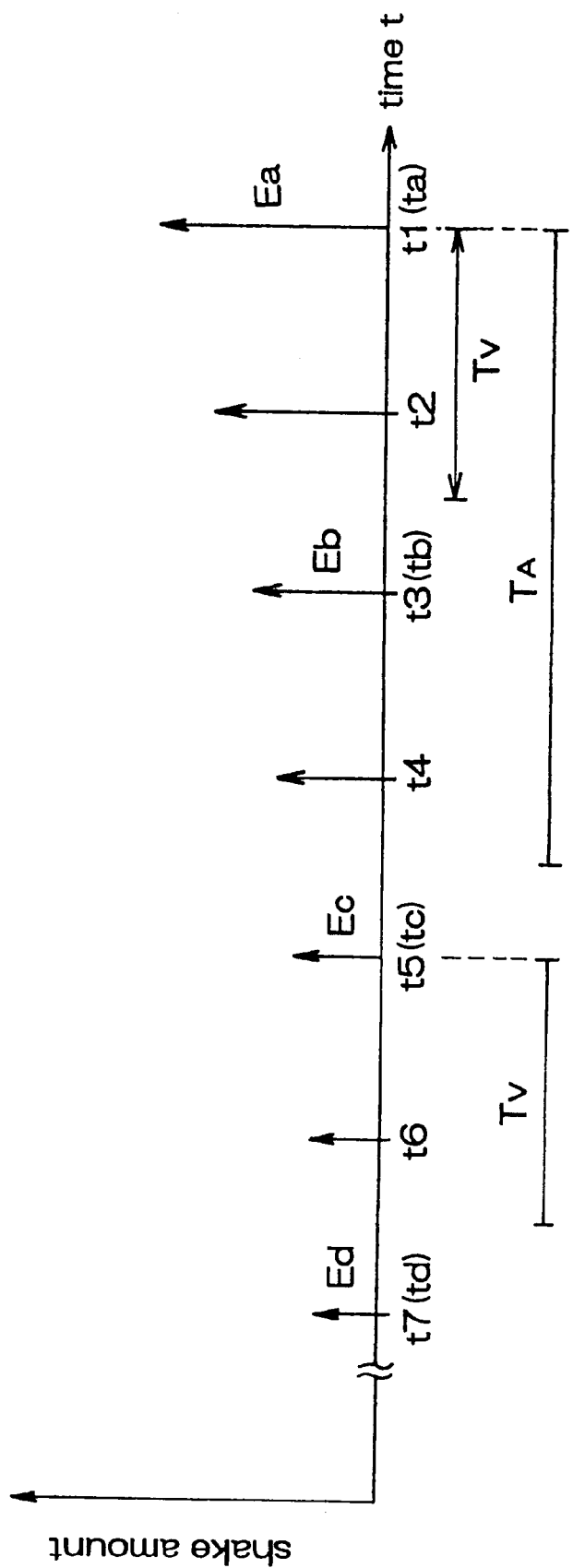
FIG. 6 is a drawing to explain shake amount data selection by a data selector.

FIG. 6 is a drawing to explain the shake amount data selection performed by the data selector 512. The data selector 512 selects and extracts from the memory 56 four shake amounts including the latest shake amount using a prescribed base interval (speed calculation interval Tv and acceleration calculation interval TA). In other words, the shake amount Ea at the latest time point t1 (hereinafter 'ta') is selected and extracted, a time point t3 (hereinafter 'tb'), which is farther away from the time point t1 than the interval Tv (the period of time necessary to seek a shake speed having the desired degree of reliability) but closest to the time point ta otherwise, is detected, and the shake amount Eb at this time point tb is selected and extracted. Then a time point t5 (hereinafter 'tc'), which is farther away from the time point ta than the time interval TA (a period of time required to seek the shake acceleration rate having the desired degree of reliability) but closest to the time point ta otherwise, is sought, and the shake amount Ec at this time point tc is selected and extracted. Further, a time point t7 (hereinafter 'td'), which is farther away from the time point tc than the interval Tv but closest otherwise, is detected, and the shake amount Ed at this time point td is selected and extracted. These four shake amounts Ea, Eb, Ec and Ed and the time points ta, tb, tc and td are selected and extracted for both the horizontal and vertical directions. They are then stored in the memory 56 such that the shake amounts are related to their corresponding time points.

The time elapses in the direction starting from the time point t1. Each time point indicates the midpoint of its corresponding integration period. The arrow pointing upward at each time point indicates the shake amount detected. These shake amounts are stored in the memory 56.

The implementation of the data selector 512 is not limited to the method described above. It is acceptable if it selects the shake amount at a time point that is closest to the time point ta but outside a prescribed base period of time, or the shake amount at a time point that is farthest away from the time point ta but within a prescribed base period of time.

The estimated shake amount calculator 513 shown in FIG. 3 calculates an estimated shake amount using the four shake amounts selected and extracted by the data selector 512 for both the horizontal and vertical directions. A shake speed V1 is sought via the equation (2) using the latest shake amount Ea and the next latest shake amount Eb, and a shake speed V2 is sought via the equation (3) using the remaining two older shake amounts Ec and Ed. A shake acceleration A is sought via the equation (4) using the shake speeds V1 and V2.

$$V1=(Ea-Eb)/(ta-tb) \qquad (2)$$

$$V2=(Ec-Ed))/(tc-td) \qquad (3)$$

$$A=(V1-V2)/(ta-tc) \qquad (4)$$

An estimated shake amount Ep is calculated via the equation (5) from the latest shake amount Ea, the shake speed V1 and the shake acceleration A, based on the supposition that shake due to hand shake changes with more or less uniform acceleration.

$$Ep=Ea+V1\times T+\tfrac{1}{2}\times k\times A\times T^2 \qquad (5)$$

Here, the constant k (0<k<1) is a correcting coefficient to bring the result closer to the actual shake amount, and T=(½)×T1+T2+T3+T4+Td. The interval Td is the period of time required between the time at which the shake amount detector 51 sends out an estimated shake amount and the time at which driving of the correction lens unit 3 is completed.

The coefficient converter 52 shown in FIG. 1 converts the estimated shake amounts in the horizontal and vertical directions into horizontal and vertical target angular positions (drive amounts) for the correction lens unit 3 using a conversion coefficient stored in the memory 56. The coefficient converter 52 also calculates an adjustment coefficient in response to the ambient temperature detected by the temperature sensor 55, and adjusts the horizontal and vertical target angular positions using this adjustment coefficient. This adjustment coefficient is used to make adjustments in changes in the focal length of the detection lens 41 and in the light refractive index (refractive power) of the correction lens unit 3.

The target position setting section 53 converts the temperature-adjusted horizontal and vertical target angular positions into target positions (positions at the completion of driving). The horizontal and vertical target positions are set in the driving section 6 as data $SD_{PH}$ and $SD_{PV}$, respectively.

The adjustment gain setting section 54 seeks horizontal and vertical gain adjustment amounts in accordance with the ambient temperature detected by the temperature sensor 55 and sets them in driving section 6 as data $SD_{GH}$ and $SD_{GV}$, respectively. The horizontal and vertical gain adjustment amounts adjust the horizontal and vertical basic gains. The data $SD_{GH}$ and $SD_{GV}$ and basic gain details are described below.

The position data input section 57 performs A/D conversion of the output signals from the position detection section 7, and monitors the positions of the horizontal shake correction lens 31 and vertical shake correction lens 32 using the output data thus obtained. By monitoring the position data, abnormalities in the drive mechanisms for the correction lens unit 3, or the camera orientation, may be detected.

The driving section 6 comprises a drive control circuit 61, a horizontal actuator 62 and a vertical actuator 63. The drive control circuit 61 generates horizontal and vertical drive signals based on the data $SD_{PH}$, $SD_{PV}$, $SD_{GH}$ and $SD_{GV}$ from the target position setting section 53 and adjustment gain setting section 54. The horizontal actuator 62 and the vertical actuator 63 each comprise a coreless motor, for example (see the motor 632 and gear 631 in FIG. 4), and drive the horizontal shake correction lens 31 and vertical shake correction lens 32 based on the horizontal and vertical drive signals generated by the drive control circuit 61.

Figure 7:
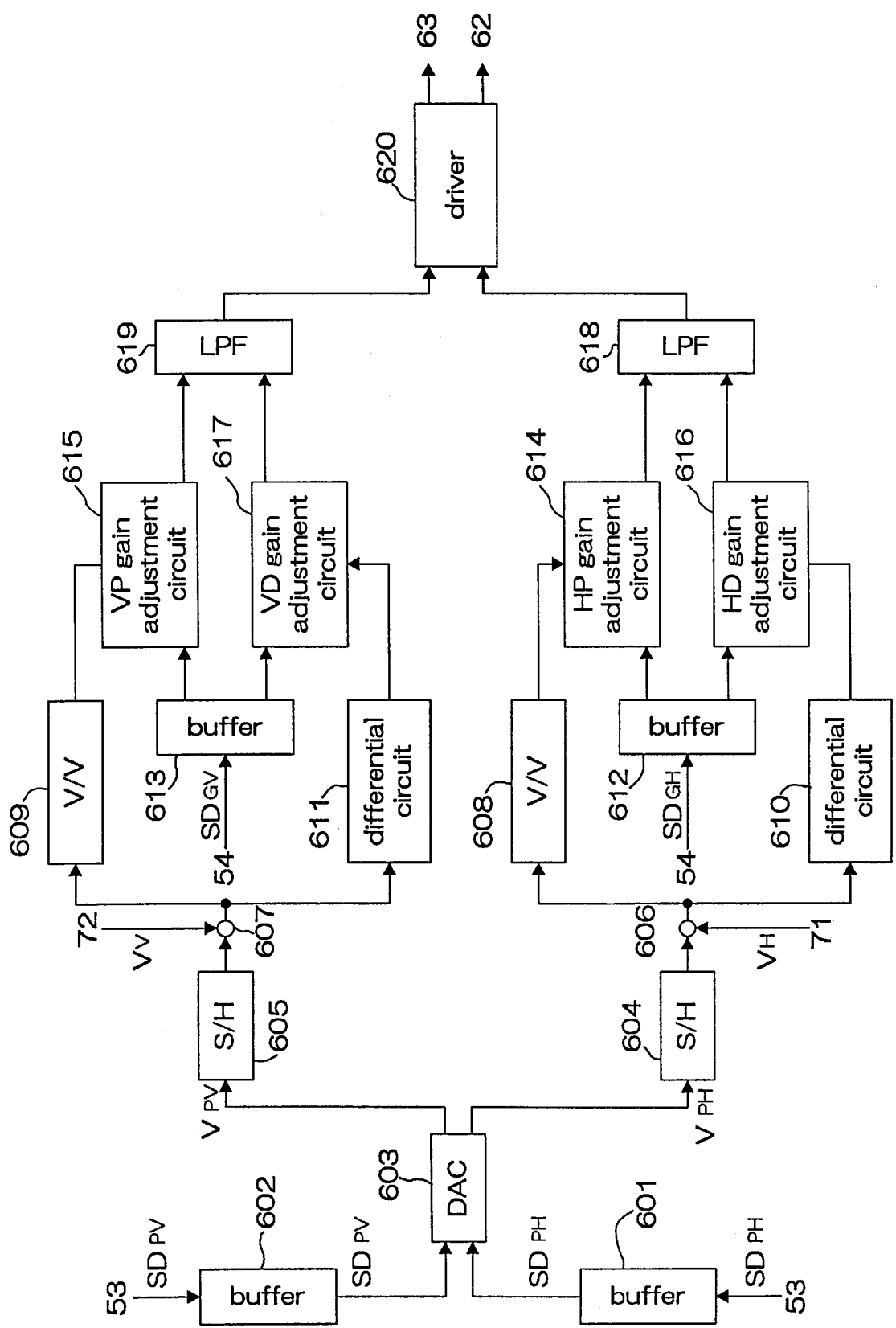
FIG. 7 is a block diagram showing one example of a drive control circuit which is a part of a servo circuit.

FIG. 7 is a block diagram showing one example of the drive control circuit 61 that comprises a part of a servo circuit. The data $SD_{GH}$ and $SD_{GV}$ set in the drive control circuit 61 will be explained first. The camera 1 changes its various characteristics regarding the shake correction drive system when the ambient temperature changes. For example, as the ambient temperature changes, changes occur in the torque constant for each motor in the driving section 6 (see the motor 632 in FIG. 4), in the backlash of the drive systems (movable mechanisms) of the correction lens unit 3 and driving section 6, and in the stickiness of the gears of said drive systems (see the gear 322 and gear 631 in FIG. 4).

Figure 8:
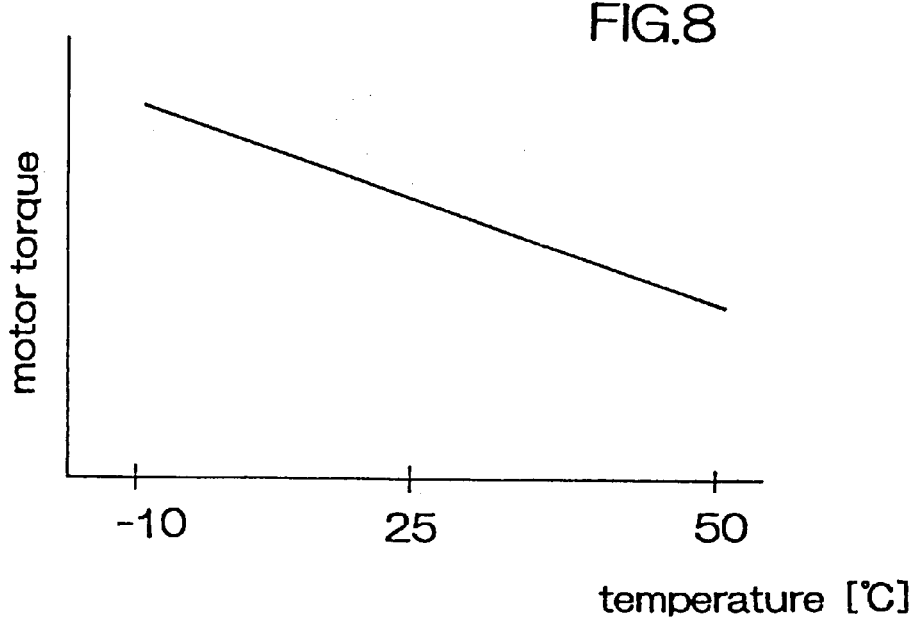
FIG. 8 is a motor torque characteristic graph in relation to temperature, which is one factor related to the change in the drive characteristics.

FIG. 8 shows a motor torque characteristic chart in relation to temperature. The torque is one factor for the change in the drive characteristics. As can be understood from FIG. 8, when the ambient temperature deviates from the base temperature (25° C., for example), the motor torque value becomes different from that at the base temperature. Consequently, the drive characteristics in connection with shake correction change. The drive characteristics obtained using the horizontal and vertical basic gains (the drive gains at the base temperature) therefore vary if the ambient temperature obtained by the temperature sensor 55 deviates from the base temperature.

Therefore, the adjustment gain setting section 54 generates a gain adjustment amount to adjust for the change in the drive characteristics obtained using the horizontal and vertical basic gains, in accordance with the ambient temperature obtained by the temperature sensor 55. In this embodiment, functions to obtain gain adjustment amounts to individually adjust for the changes in the motor torque, backlash and gear stickiness (the ambient temperature is the argument) that occur when the ambient temperature deviates from the base temperature are predetermined in advance for both the horizontal and vertical directions. The ambient temperature detected by the temperature sensor 55 is then input into each adjustment function for both the horizontal and vertical directions and the aggregate of the values thus obtained is sought as the gain adjustment amount. The horizontal and vertical gain adjustment amounts are set in the drive control circuit 61 as data $SD_{GH}$ and $SD_{GV}$.

The drive control circuit 61 will now be explained. Although in FIG. 1 the data $SD_{GH}$ and $SD_{GV}$ are shown for the sake of convenience as if they were transmitted via two signal lines, in actuality, they are serially transmitted and set via two data lines not shown in the drawing (SCK and SD) and three control lines (CS, DA/GAIN and X/Y). Similarly, the data $SD_{PH}$ and $SD_{PV}$ are alternatively sent to the drive control circuit 61.

Therefore, the drive control circuit 61 has a construction that includes buffers and sample-and-hold circuits. In other words, in FIG. 7, buffers 601 and 602 are memories that store the data $SD_{PH}$ and $SD_{PV}$ that are alternatively set by the target position setting section 53.

DAC 603 is a D/A converter that converts the data $SD_{PH}$ set in a buffer 601 into a target position voltage $V_{PH}$. DAC 603 converts the data $SD_{PV}$ set in a buffer 602 into a target position voltage $V_{PV}$.

S/H 604 and S/H 605 are sample-and-hold circuits. The S/H 604 samples the target position voltage $V_{PH}$ converted by the DAC 603 and holds the sampled value until the next sampling occurs. Similarly, the S/H 605 samples the target position voltage $V_{PV}$ converted by the DAC 603 and holds the sampled value until the next sampling occurs.

Adding circuit 606 seeks the voltage differential between the target position voltage $V_{PH}$ and the output voltage $V_H$ from the horizontal position detector 71. The adding circuit 607 seeks the difference between the target position voltage $V_{PV}$ and the output voltage $V_V$ from the vertical position detector 72. In other words, in the adding circuits 606 and 607, the difference in voltage can be obtained through addition because the output voltages $V_H$ and $V_V$ are obtained in the form of negative voltages by the horizontal position detector 71 and the vertical position detector 72.

V/V 608 amplifies the input voltage into a horizontal proportional gain voltage using a ratio preset for the base temperature. The V/V 609 amplifies the input voltage into a vertical proportional gain voltage using a ratio preset for the base temperature. Here, the horizontal proportional gain is a gain that is proportional to the difference between the target position for the horizontal shake correction lens 31 and the position of said lens detected by the horizontal position detector 71. The vertical proportional gain is a gain that is proportional to the difference between the target position for the vertical shake correction lens 32 and the position of said lens detected by the vertical position detector 72.

The differential circuit 610 performs differential calculation of the difference in voltage obtained by the adding circuit 606 using a time constant preset for the base temperature to obtain a horizontal differential gain voltage. The voltage thus obtained translates into the difference in horizontal speed (the difference between the target drive speed and the current drive speed). Similarly, the differential circuit 611 performs differential calculation of the voltage differential obtained by the adding circuit 607 using a time constant preset for the base temperature to obtain a vertical differential gain voltage. The voltage thus obtained translates into the difference in vertical speed (the difference between the target drive speed and the current drive speed).

As described above, the proportional gains and differential gains are set as the basic gains for the base temperature by the V/V 608 and the V/V 609 and the differential circuits 610 and 611 for both the horizontal and vertical directions.

The buffer 612 is a memory to store the data $SD_{GH}$ from the adjustment gain setting section 54. This data $SD_{GH}$ comprises gain adjustment amounts (proportional gain adjustment amount and differential gain adjustment amount) to adjust the horizontal basic gains (proportional gain and differential gain). The buffer 613 is a memory to store the data $SD_{GV}$ from the adjustment gain setting section 54. This data $SD_{GV}$ comprises gain adjustment amounts (proportional gain adjustment amount and differential gain adjustment amount) to adjust the vertical basic gains (proportional gain and differential gain).

The HP gain adjustment circuit 614 applies to the horizontal proportional gain obtained by the V/V 608 an analog voltage that corresponds to the horizontal proportional gain adjustment amount from the buffer 612, and outputs a temperature-adjusted horizontal proportional gain. The VP gain adjustment circuit 615 applies to the vertical proportional gain obtained by the V/V 609 an analog voltage that corresponds to the vertical proportional gain adjustment amount from the buffer 613, and outputs a temperature-adjusted vertical proportional gain.

The HD gain adjustment circuit 616 applies to the horizontal differential gain obtained by the differential circuit 610 an analog voltage that corresponds to the horizontal differential gain adjustment amount from the buffer 612, and outputs a temperature-adjusted horizontal differential gain. The VD gain adjustment circuit 617 applies to the vertical differential gain obtained by the differential circuit 611 an analog voltage that corresponds to the vertical differential gain adjustment amount from the buffer 613, and outputs a temperature-adjusted vertical differential gain.

As described above, the basic proportional gains and differential gains are temperature-adjusted by the HP gain adjustment circuit 614, the VP gain adjustment circuit 615, the HD gain adjustment circuit 616 and the VD gain adjustment circuit 617.

LPF 618 is a low-pass filter that eliminates high-frequency noise included in the output voltages from the HP gain adjustment circuit 614 and the HD gain adjustment circuit 616. The LPF 619 is a low-pass filter that eliminates high-frequency noise included in the output voltages from the VP gain adjustment circuit 615 and the VD gain adjustment circuit 617.

Driver 620 is a motor driver IC to supply to the horizontal actuator 62 and the vertical actuator 63 drive current corresponding to the output voltages from the LPF 618 and the LPF 619.

The position detector 7 shown in FIG. 1 comprises a horizontal position detector 71 and a vertical position detector 72. The horizontal position detector 71 and the vertical position detector 72 detect the current positions of the horizontal shake correction lens 31 and the vertical shake correction lens 32, respectively.

Figure 9:
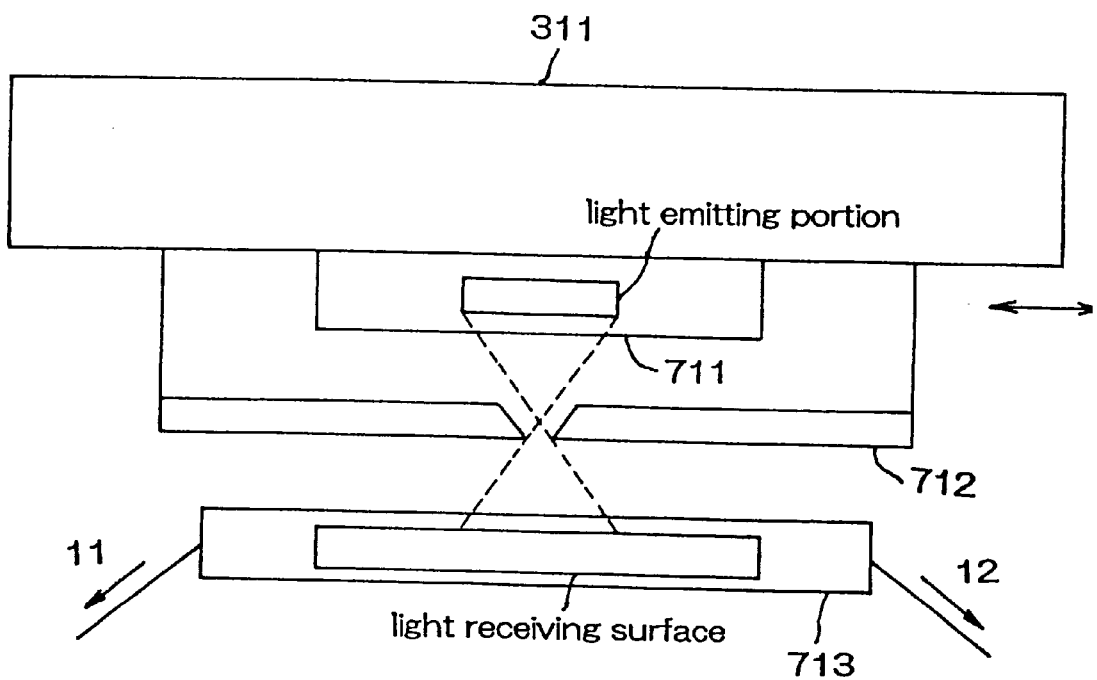
FIG. 9 is a diagram showing the construction of a horizontal position detector.

FIG. 9 is a diagram showing the construction of the horizontal position detector 71. The horizontal position detector 71 has a light emitting diode (LED) 711, a slit member 712 and a position sensing device (PSD) 713. The LED 711 is connected to the frame 311 of the horizontal shake correction lens 31 (see the LED 721 in FIG. 4) at the position where the gear is formed. The slit in the slit member 712 narrows the directivity of the light emitted from the light emitting portion of the LED 711. The PSD 713 is connected at a position opposite from the LED 711 inside the lens barrel 24, and outputs photoelectric conversion currents I1 and I2 having values corresponding to the position at which the light rays emitted by the LED 711 are received, that is, the center of gravity of the received light. By measuring the difference between the photoelectric conversion currents I1 and I2, the position of the horizontal shake correction lens 31 can be detected. The vertical position detector 72 is similarly constructed so as to detect the position of the vertical shake correction lens 32 in the same fashion.

Figure 10:
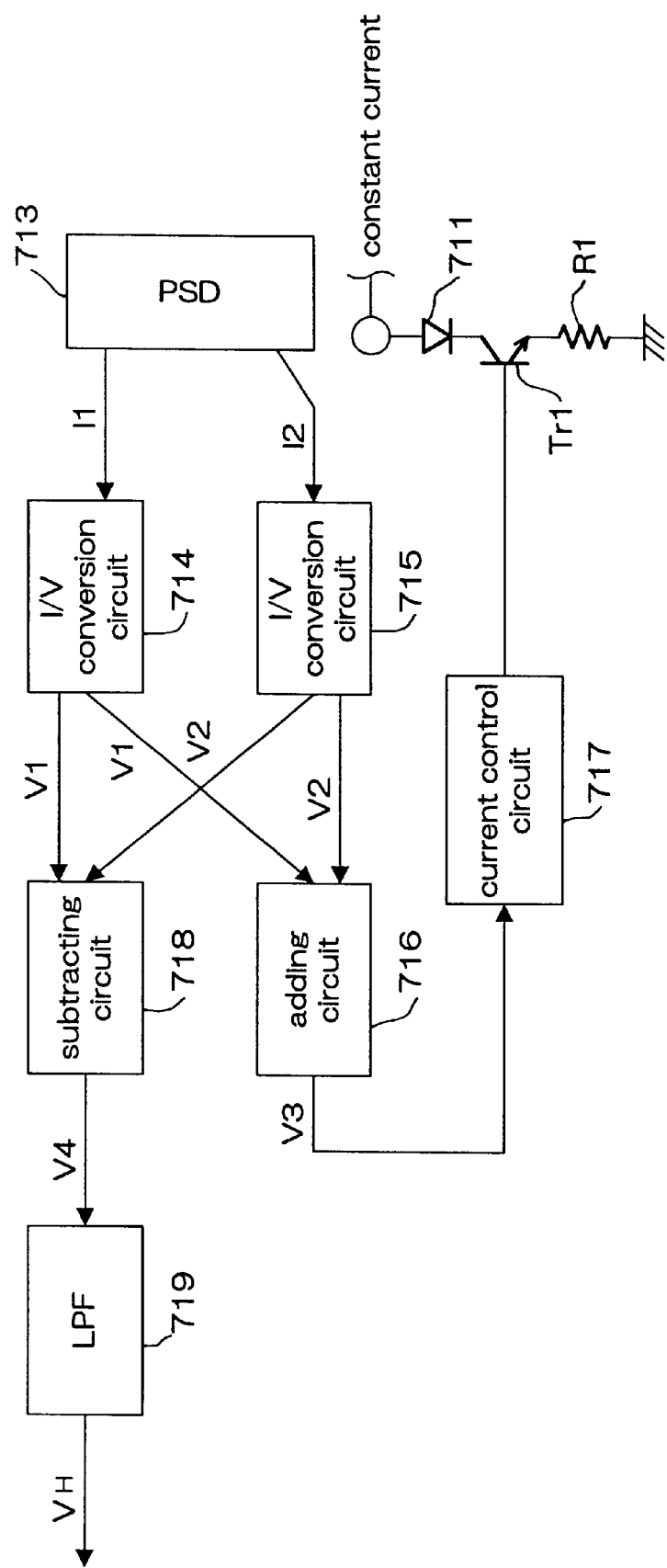
FIG. 10 is a block diagram of the horizontal position detector.

FIG. 10 is a block diagram of the horizontal position detector 71. The horizontal position detector 71 comprises, in addition to the LED 711 and the PSD 713, I/V conversion circuits 714 and 715, an adding circuit 716, a current control circuit 717, a subtracting circuit 718, and an LPF 719. The I/V conversion circuits 714 and 715 convert the output currents I1 and I2 from the PSD 713 into voltages V1 and V2, respectively. The adding circuit 716 adds the output voltages V1 and V2 from the I/V conversion circuits 714 and 715 to obtain a sum voltage V3. The current control circuit 717 increases or reduces the base current of a transistor Tr1 so that the output voltage V3 from the adding circuit 716, i.e., the amount of light emitted from the LED 711, will be maintained at a constant level. The subtracting circuit 718 seeks a voltage differential V4 comprising the difference between output voltages V1 and V2 of I/V conversion circuits 714 and 715. The LPF 719 filters out the high-frequency component of the output voltage V4 transmitted from the subtracting circuit 718.

The detecting operation performed by the horizontal position detector 71 will now be explained. The currents I1 and I2 sent from the PSD 713 are converted respectively into the voltages V1 and V2 by the I/V conversion circuits 714 and 715.

The voltages V1 and V2 are then added together by the adding circuit 716. The current control circuit 717 supplies to the base of the transistor Tr1 a current that maintains at a constant level the voltage V3 obtained via this calculation. The LED 711 emits an amount of light corresponding to this base current.

Meanwhile, subtraction is performed to the voltages V1 and V2 by the subtracting circuit 718. The voltage V4 obtained through this subtraction is a value indicating the position of the horizontal shake correction lens 31. For example, where the light-receiving position (centroid position) deviates from the center of the PSD 713 to the right by length x, the length x, the currents I1 and I2 and the length L of the light-receiving area of the PSD 713 satisfy the function expressed by the equation (6) below.

$$(I2-I1)/(I2+I1)=2 \cdot x/L \qquad (6)$$

Similarly, the length x, the voltages V1 and V2 and the length L of the light-receiving area satisfy the function expressed by the equation (7) below.

$$(V2-V1)/(V2+V1)=2 \cdot x/L \qquad (7)$$

If control is performed such that the sum V2+V1, i.e., the voltage V3, is maintained at a constant level, the function expressed by the equation (8) below is obtained, and the difference V2−V1, i.e., the voltage V4, indicates the value of the length x. If the voltage V4 is therefore monitored, the position of the horizontal shake correction lens 31 can be detected.

$$V2-V1 \, x \qquad (8)$$

The exposure control section 8 shown in FIG. 1 comprises a light measuring section 81, an exposure determining section 82, a flash light emitter 83 and a flash controller 84. Although the flash light emitter 83 and the flash controller 84 are built in the camera 1 in this embodiment, they can be provided as a detachable accessory of the camera 1.

The mode determining section 9 monitors a switch $S_{MD}$ that switches among a 'flash emission prohibited mode', a 'night-view mode', a 'slow synchro mode' and a 'flash auto mode', and determines which of these modes is active.

The light measuring section 81 receives light from the object by means of a photoelectric conversion element such as an SPC (silicon photo cell) or Cds (cadmium sulfide) element, and detects the brightness of the object.

Figure 11:
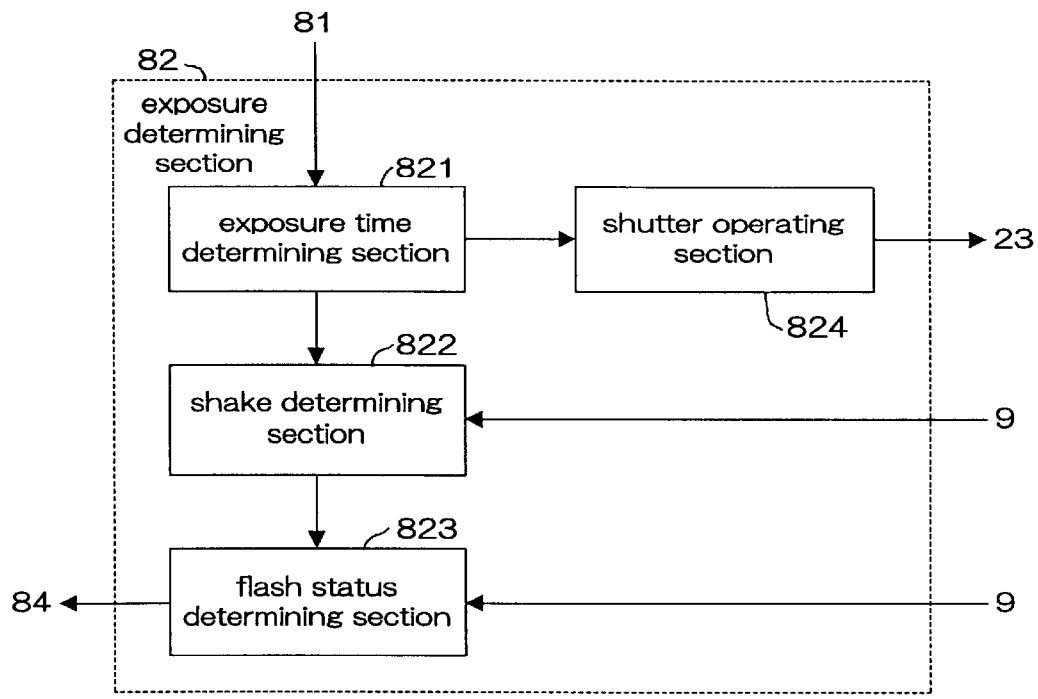
FIG. 11 is a block diagram of an exposure determining member.

FIG. 11 is a block diagram of the exposure determining section 82. The exposure determining section 82 comprises an exposure time determining section 821, a shake determining section 822, a flash status determining section 823 and a shutter operating section 824. The exposure time determining section 821 determines the appropriate exposure time tss in accordance with the object brightness detected by the light measuring section 81.

The shake determining section 822 determines whether or not the appropriate exposure time determined by the exposure time determining section 821 exceeds the hand shake maximum interval $T_{LMD}$ (i.e., the shutter speed is slower than the interval $T_{LMD}$) where the mode determining section 9 has determined that the active mode is 'flash auto mode'. The hand shake maximum interval is an interval within which shake of the object image due to hand shake is not noticeable. For example, where the focal length of the taking lens 21 is deemed F(mm), it is the interval defined by 1/(1.4×F), in seconds. If the appropriate exposure time exceeds the hand shake maximum interval (i.e., the shutter speed is slower than the hand shake maximum interval), the shake in the object image becomes noticeable (i.e., occurs).

The flash status determining section 823 determines whether or not the flash unit should be activated. Where 'flash auto mode' is active, if the appropriate exposure time exceeds the hand shake maximum interval, it determines that the flash unit is to be activated and sets the flag $F_F$ to '1', while if the appropriate exposure time does not exceed the hand shake maximum interval, it determines that the flash unit is not to be activated and sets the flag $F_F$ to '0'. Where 'slow synchro mode' is active, it determines that the flash unit is to be activated and sets the flag $F_F$ to '1', while if 'flash emission prohibited mode' or 'night-view mode' is active, it determines that the flash unit is not to be activated and sets the flag $F_F$ to '0'. The status of this flag $F_F$ is transmitted to the flash controller 84.

The shutter operating section 824 has a timer not shown in the drawings. It starts the timer at the same time that it opens the shutter 23, and then closes the shutter 23 when the time elapsed after the timer was started reaches the appropriate exposure time.

The flash light emitter 83 shown in FIG. 1 comprises a light emission element which is a white light source such as a xenon tube, and a charging capacitor (not shown in the drawing) that supplies charging current to this light emission element. In this embodiment, when a control port ($P_F$) not shown in the drawing is set to '1', the supply of charging current from the charging capacitor to the light emission element is begun, and when it is set to '0', the supply is terminated.

The flash controller 84 begins the supply of charging current from the charging capacitor to the light emission element and monitors the amount of flash light that reflects off the object and returns to the camera. When the amount of light monitored reaches the appropriate exposure amount, it stops the supply of charging current. In this embodiment, the flash controller 84 has an interrupt timer not shown in the drawings. When the flash unit is activated (i.e., when the flag $F_F$ is set to '1'), the supply of charging current to the light emission element is begun ('1' is sent to the control port $P_F$) after a prescribed period of time has elapsed from the start of the interrupt timer, and the interrupt timer is started once more. When the flash emission interval has elapsed after this timer restart, the supply of charging current to the light emission element is terminated ('0' is sent to the control port $P_F$). The flash emission interval is calculated beforehand in response to object conditions such as its distance or brightness so that flash light emission will be terminated at the time at which the amount of light received during monitoring reaches the appropriate exposure amount.

If the integration period starts (i.e., if the flag $F_I$ indicating that integration is underway is set to '1') between the time at which the supply of charging current to the light emission element is begun and the time at which the supply is terminated, the flash controller 84 sets the flag $F_{IF}$ indicating that flash light was emitted during the integration period to '1'. The status of this flag $F_{IF}$ is transmitted to the substitute determining section 511d.

The distance measurement module 10 comprises an infrared LED (IRED) and a one-dimensional PSD that receives LED light that has reflected off the object and returned to the camera. It obtains distance information corresponding to the distance to the object in response to the light-receiving position on the PSD. The distance measurement module 10 is not limited to this active method of distance measurement, however, and a passive module comprising a pair of line sensors that receive the light from the object may be used instead. With the passive module, the object image light is received by the pair of line sensors and distance data corresponding to the object distance is sought from the difference in position of the object image between the two line sensors.

The focusing mechanism 11 seeks a driving amount in response to the distance information from the distance measurement module 10 and drives the taking lens 21 to the in-focus position in response to this driving amount.

The shake amount display section 12 displays the shake status in accordance with the shake amount transmitted from the shake amount detector 51 by means of an LED segment within the viewfinder, for example. Consequently, the current amount of camera shake can be observed.

Figure 12:
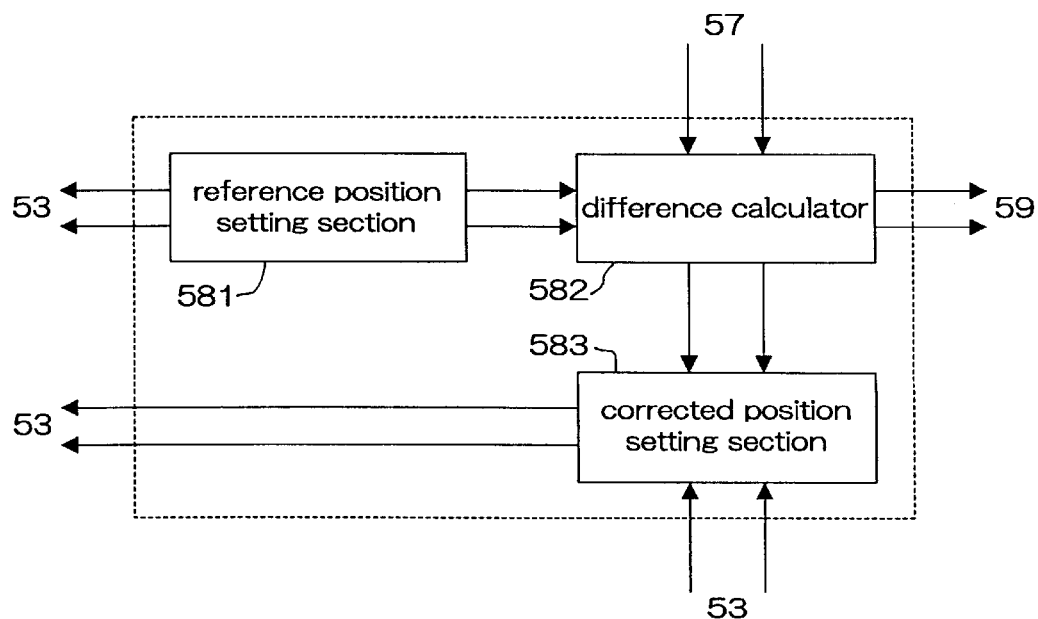
FIG. 12 is a block diagram of a reference/corrected position setter.

FIG. 12 is a diagram showing the construction of the reference/corrected position setting section 58. The reference/corrected position setting section 58 comprises a reference position setting section 581, a difference calculator 582 and a corrected position setting section 583.

The reference position setting section 581 instructs the target position setting section 53 to set in the driving section 6 as data $SD_{PH}$ and $SD_{PV}$ the horizontal and vertical reference position data to move the lenses of the correction lens unit 3 to the center position.

The difference calculator 582 receives from the position data input section 57 the position data for the lenses of the correction lens unit 3 after they have been moved in response to the horizontal and vertical reference position data and calculates the difference between the received positions and the horizontal and vertical reference positions. The obtained difference data is sent to the corrected position setting section 583 and the orientation determining section 59.

Figure 13A:
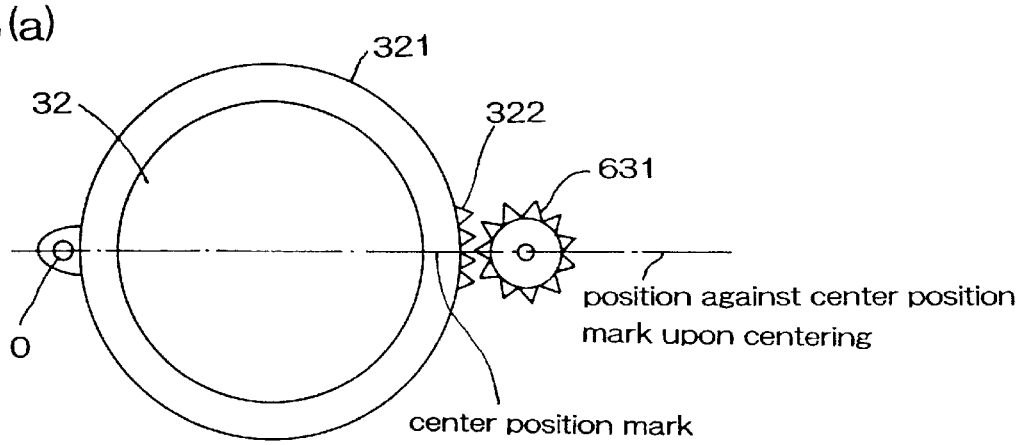
FIGS. 13(a) through 13(c) are front views of the vertical shake correction lens to explain the difference calculated by the difference calculator.
Figure 13B:
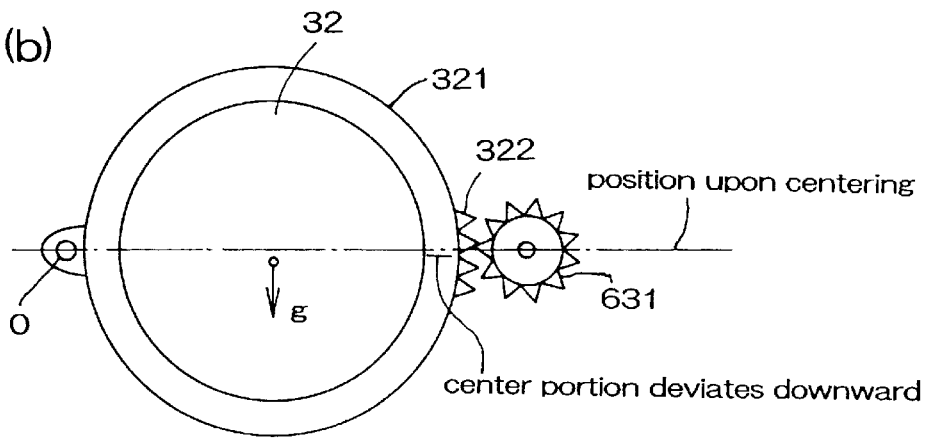
Figure 13C:
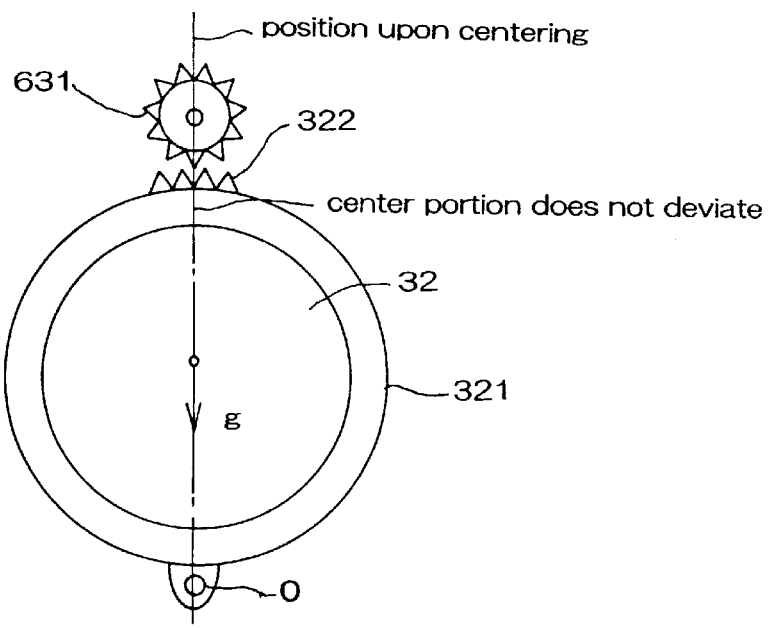

FIGS. 13(a) through 13(c) are front views of the vertical shake correction lens 32 to explain the difference calculated by the difference calculator 582. FIG. 13(a) shows the case where the taking lens faces up or down, FIG. 13(b) shows the case where the camera is in landscape orientation, and FIG. 13(c) shows the case where the camera is in portrait orientation.

For example, if the servo power of the motor 632 (see FIG. 4) that rotates the gear 631 and stops in response to the vertical reference position (such as the center position) data were not affected by the gravitational force of the vertical shake correction lens 32 and the frame 321, the vertical shake correction lens 32 would stop precisely at the center position, as shown in FIG. 13(a).

If the camera is in landscape orientation, the servo power of the motor 632 that is currently stopped is overcome by the downward gravitational force of the vertical shake correction lens 32 and the frame 321, and thus the vertical shake correction lens 32 cannot rise to the center position and reaches an equilibrium stop point at a position slightly below it, as shown in FIG. 13(b).

Conversely, if the camera is in portrait orientation, the servo power of the motor 632 that is currently stopped is completely or almost completely unaffected by gravitational force as shown in FIG. 13(c), and thus the vertical shake correction lens 32 stops precisely or almost precisely at the center position.

The landscape orientation difference data is therefore sought beforehand and stored in the memory 56. Similarly, with regard to the horizontal shake correction lens 31, the portrait orientation difference data is sought beforehand and stored in the memory 56.

Figure 14:
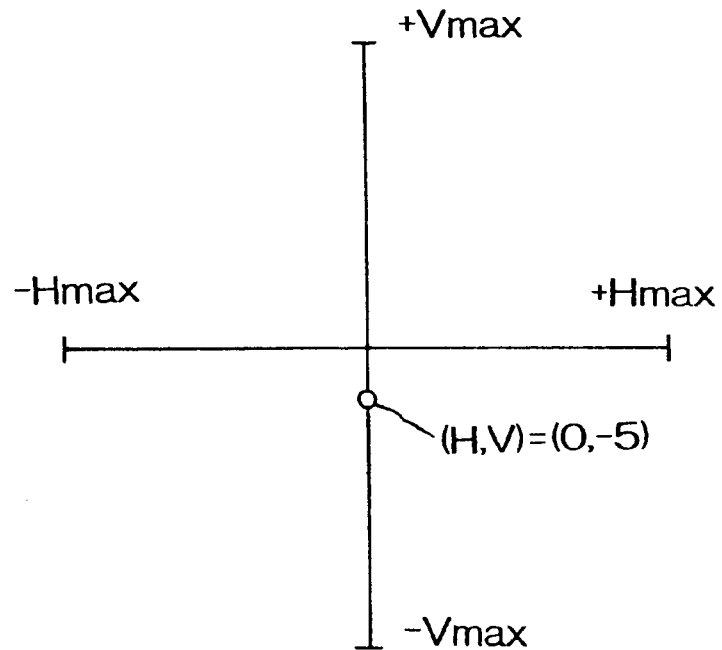
FIG. 14 is a diagram showing an example of the position at which the correction lens unit stops when the camera is in landscape orientation.
Figure 15:
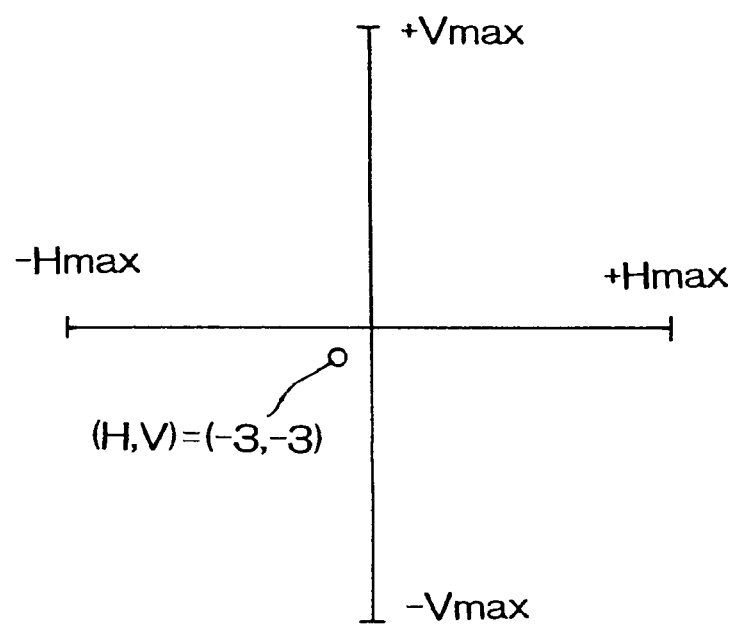
FIG. 15 is a diagram showing an example of the position at which the correction lens unit stops when the camera is in slanted orientation.

FIG. 14 is a drawing showing the position at which the correction lens unit 3 stops, using the example of landscape camera orientation in order to explain the orientation information for the camera 1 stored beforehand in the memory 56 together with the difference data. $-H_{max}$ to $+H_{max}$ indicates the movable range of the horizontal shake correction lens 31, while $-V_{max}$ to $+V_{max}$ indicates the movable range of the vertical shake correction lens 32.

Where the camera is in landscape orientation, when the horizontal and vertical reference position data are set, the horizontal shake correction lens 31 stops at the reference position (H=0), and the vertical shake correction lens 32 stops at a position offset downward from the reference position (v=−5). The camera orientation information indicating 'landscape orientation' here is stored in the memory 56 together with the difference data (0,−5). Similarly, the camera orientation information indicating 'portrait orientation' where the right side of the camera 1 is at the top is stored in the memory 56 together with the difference data (−5, 0), and the camera orientation information indicating 'portrait orientation' where the right side of the camera 1 is at the bottom is stored in the memory 56 together with the difference data (5, 0).

The invention is not limited to the landscape and portrait orientations described above, however, and may encompass the detection of diagonal camera orientations as well. In this case, if the right side of the camera 1 is raised at a 45 degree angle, camera orientation information indicating 'diagonal orientation' is stored in the memory 56 together with the difference data (−3,−3), and if the left side of the camera 1 is raised at a 45 degree angle, camera orientation information indicating 'diagonal orientation' is stored in the memory 56 together with the difference data (3,−3). If a lens that can move in two dimensions is used, the difference data can be measured two-dimensionally using a single lens. The invention is not limited to the camera orientation determination described above, however, and where the difference data is unstable, it may be determined that the orientation of the camera 1 is unstable. In other words, if both data items are handled as vectors, complete orientation detection (orientation determination) becomes possible.

The corrected position setting section 583 shown in FIG. 12 maintains the difference data from the difference calculator 582, adds the horizontal and vertical values of their respective difference data to the horizontal and vertical target positions obtained from the conversion by the target position setting section 53 (the difference data is sought such that the target position may be corrected by adding the difference data values; however, where the difference data is sought such that the target position may be corrected by subtracting the difference data values, subtraction is performed), and corrects the horizontal and vertical target positions. Through this correction, the lenses of the correction lens unit 3 are moved precisely to the corresponding target positions. The corrected horizontal and vertical target positions are transmitted to the target position setting section 53 and are set in the driving section 6 as data $SD_{PH}$ and $SD_{PV}$, respectively. The corrected position setter 583 may have a construction in which it has a memory to maintain the difference data, or one in which the RAM of the memory 56 is used.

The orientation determining section 59 shown in FIG. 1 compares the difference data from the difference calculator 582 and the registration data from the memory 56 and detects (determines) the orientation of the camera 1. For example, where the difference data is (0,−5), the camera 1 is determined after comparison to be in landscape orientation. The ability to determine the orientation of the camera makes selection of a shake detection area and selection of a distance measurement area for auto-focusing easy, and enables control to be performed more accurately and quickly.

The shake sensor controller 43, the signal processor 44, the shake amount detector 51, the coefficient converter 52, the target position setting section 53, the adjustment gain setting section 54, the position data input section 57, the reference/corrected position setting section 58, the orientation determining section 59, the exposure determining section 82 (excluding the part that drives the shutter operating section 824), the flash controller 84 and the mode determining section 9 each comprise a microprocessor unit (MPU) that executes the programs describing the processes discussed below. The various members described above may comprise a single or multiple MPUs.

The operation of the camera 1 will now be explained.

Figure 16:
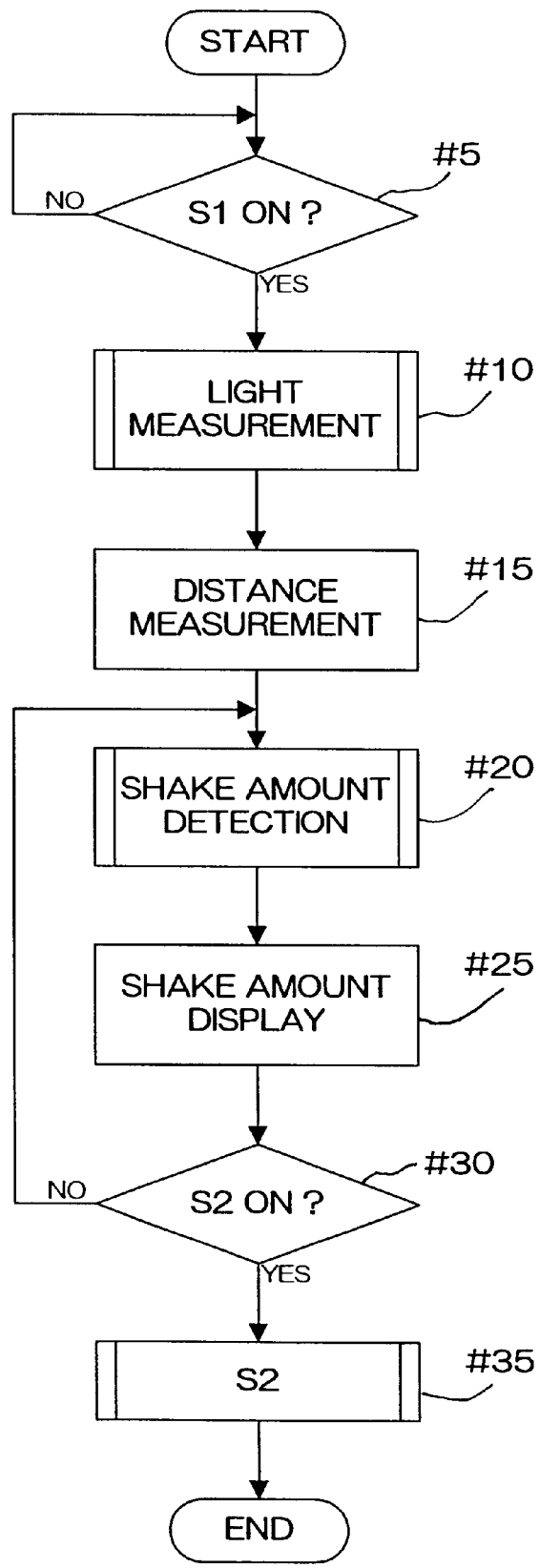
FIG. 16 is a flow chart showing the operation of the camera.

FIG. 16 is a flow chart showing the operation of the camera 1. When the camera sequence is started, it is determined whether or not the switch S1 is ON (#5) This step is repeated until it is determined that the switch S1 is ON (NO in #5). When it is determined that the switch S1 is ON (YES in #5), the 'light measurement' subroutine is executed to perform appropriate exposure onto the film 22 (#10).

Figure 17:
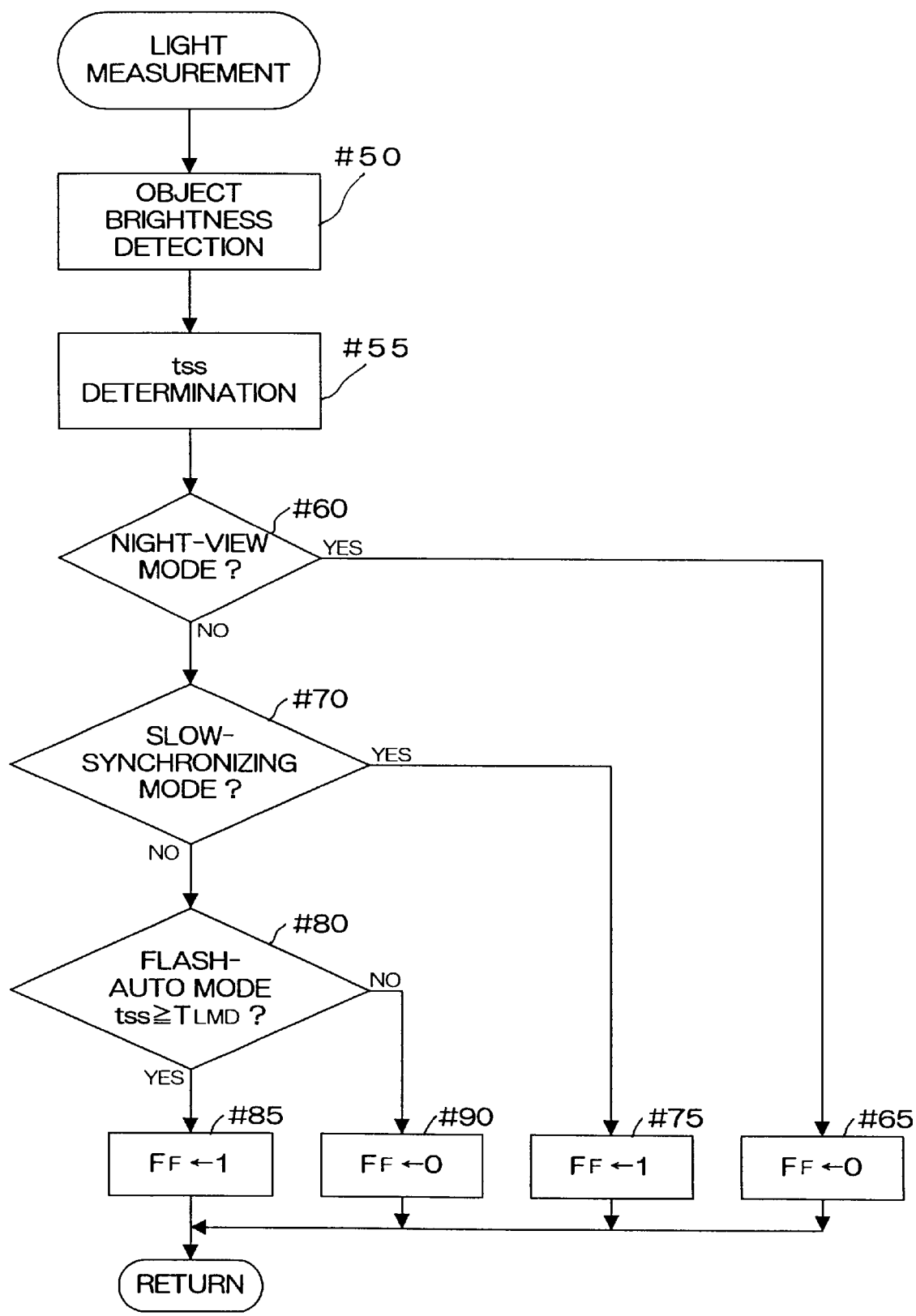
FIG. 17 is a flow chart showing the 'light measurement' subroutine.

FIG. 17 is a flow chart showing the 'light measurement' subroutine. When this subroutine is called, the light from the object is received and the object brightness is detected by the light measuring section 81 (#50), and an appropriate exposure time tss is determined in response to this object brightness (#55).

It is then determined whether the selected mode is 'night-view mode' (#60), and if it is (YES in #60), the flag $F_F$ is set to '0' (#65) and the camera returns to the main routine.

If the selected mode is not 'night-view mode' (NO in #60), it is determined whether the selected mode is 'slow synchro mode' (#70), and if it is (YES in #70), the flag $F_F$ is set to '1' (#75) and the camera returns to the main routine.

If the selected mode is not 'slow synchro mode' (NO in #70), then it is 'flash auto mode', and it is determined whether or not the appropriate exposure time tss exceeds the hand shake maximum interval $T_{LMD}$ (#80). If the result of step #80 is YES, the flag $F_F$ is set to '1' (#85), and if not, it is set to '0' (#90).

The camera sequence then returns to the main routine, and the distance information necessary to obtain a focused image on the surface of the film 22 is obtained (#15 in FIG. 16). The 'shake amount detection' subroutine is then executed (#20).

Figure 18:
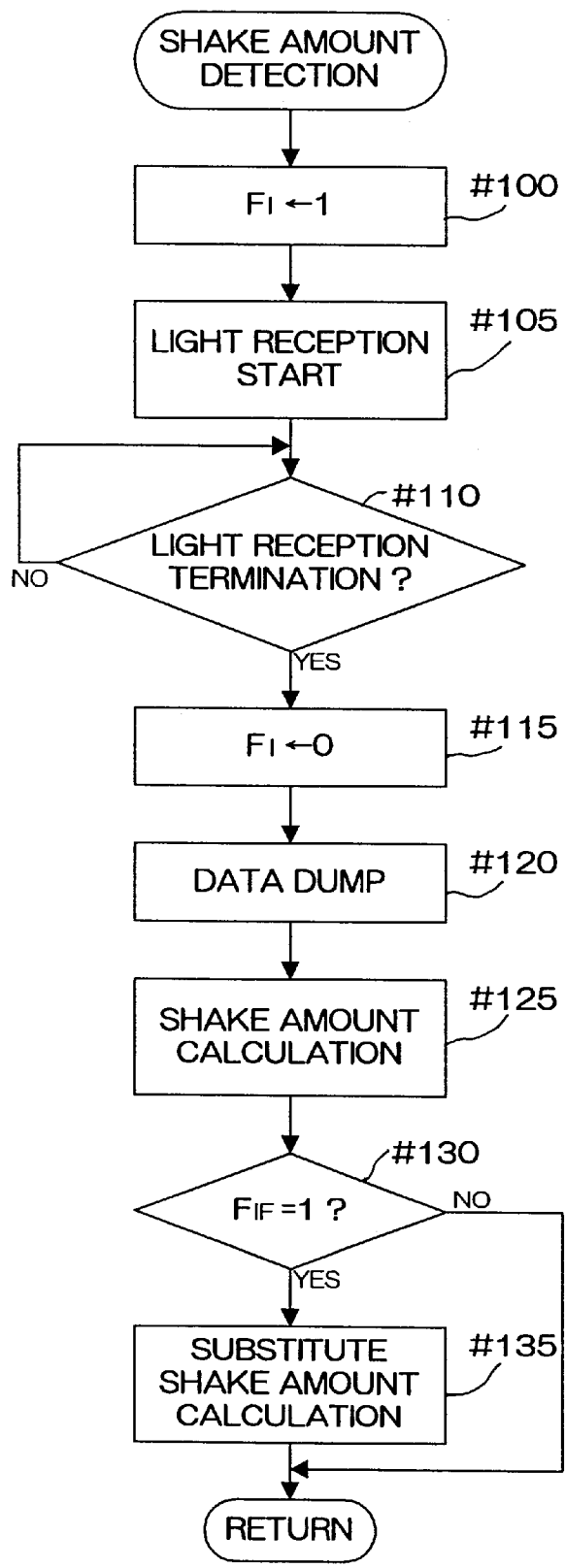
FIG. 18 is a flow chart showing the 'shake amount detection' subroutine.

FIG. 18 is a flow chart showing the 'shake amount detection' subroutine. When this subroutine is called, the flag $F_I$ indicating that the integration period is underway is set to '1' (#100) and the light receiving operation is begun (#105).

It is then determined whether or not the light receiving operation is completed in response to the presence of a light receiving completed signal (#110). This determination is repeated until the light receiving completed signal is received (NO in #110). When the light receiving operation is completed (YES in #110), the flag $F_I$ is set to '0' (#115).

The image signal obtained in the light receiving operation by the shake sensor 42 is converted into image data by the signal processor 44 and dumped in the memory 56 (#120). In the initial data dump, either shake detection area A1 or shake detection area A2 is selected. The shake amount is then sought (#125).

It is then determined whether or not the flash unit emitted light during the integration period, i.e., whether or not the flag $F_{IF}$ is set to '1' (#130). In this case, because the flash unit did not emit light during the integration period and the flag $F_{IF}$ is not set to '1' (NO in #130), the camera sequence returns to the main routine.

The shake status is then displayed in the viewfinder in accordance with the shake amount sought in step #125 (#25 in FIG. 16). It is then determined whether or not a switch S2 is ON (#30). If the switch S2 is not ON, the camera returns to step #20. Consequently, the shake amount calculation and shake status display are then repeated.

If the switch S2 is ON (YES in #30), the 'S2' subroutine is executed (#35).

Figure 19:
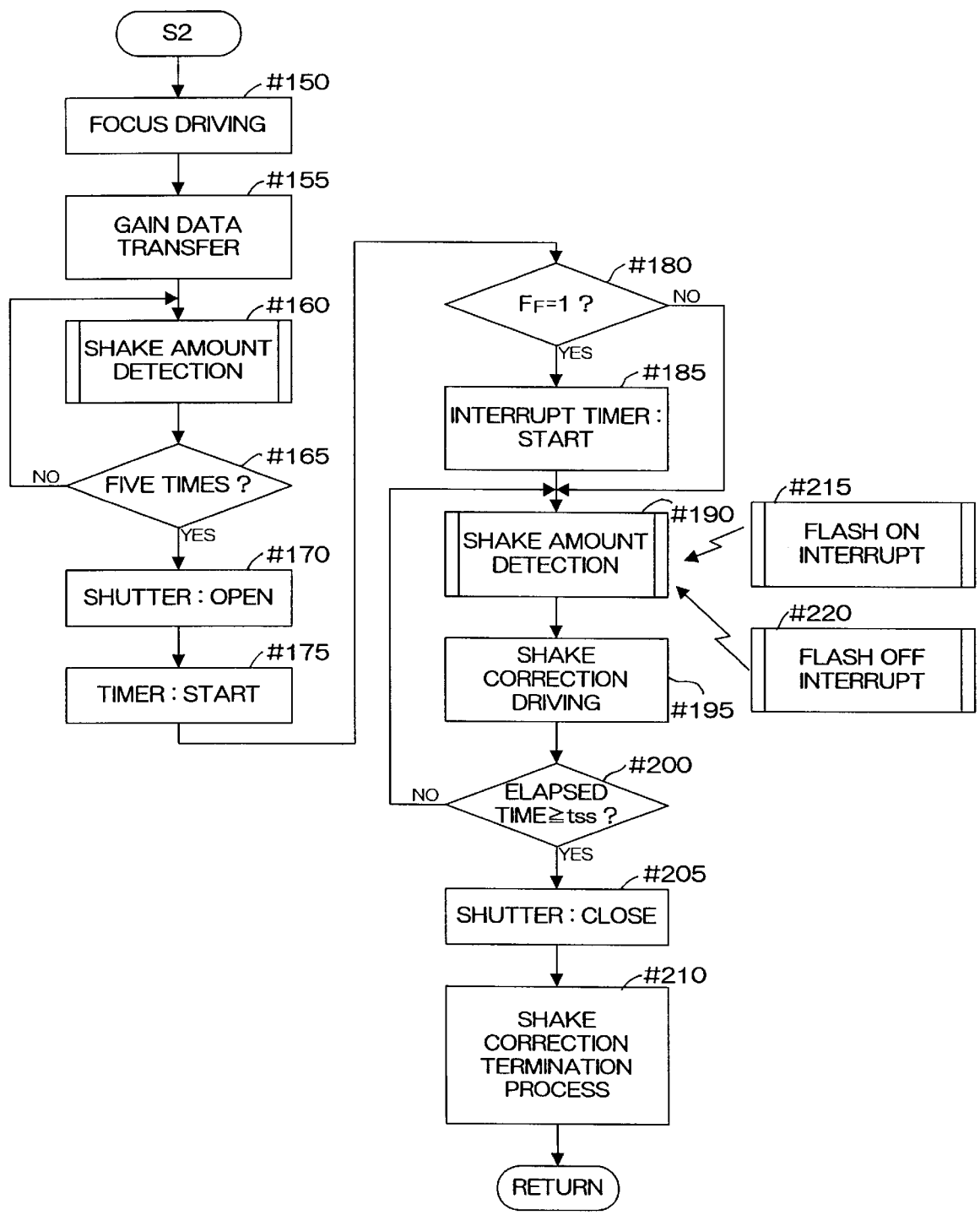
FIG. 19 is a flow chart showing the 'S2' subroutine.

FIG. 19 is a flow chart showing the 'S2' subroutine. When this subroutine is called, the driving amount is sought in accordance with the distance information obtained in step #15 of FIG. 16, and the taking lens 21 is driven to the focus position in response to the driving amount (#150). The horizontal and vertical gain adjustment amounts are then sought in response to the ambient temperature detected by the temperature sensor 51, and these amounts are set in the drive controller 61 as data $SD_{GH}$ and $SD_{GV}$, respectively (#155).

The 'shake amount detection' subroutine of FIG. 18 is then called (#160), and after the processes of steps #100 through #125 are executed, the camera sequence returns to the main routine after step #130 results in a NO.

It is then determined whether or not the processes of this subroutine have been repeated five times (#165). If they have not (NO in #165), the camera sequence returns to step #160. In this way, shake amounts necessary for the calculation of an estimated shake amount are stored in the memory 56. If the 'shake amount detection' subroutine has been repeated five times, (YES in #165), the shutter 23 opens (#170) and the timer to close the shutter 23 after the appropriate exposure time has elapsed starts (#175).

It is then determined whether or not the flash unit is activated, i.e., whether or not the flag $F_F$ is set to '1' (#180). If the flag $F_F$ is set to '1' (YES in #180) the flash light emission interrupt timer is started (#185), and if it is not (NO in #180), step #185 is skipped. When the interrupt timer is started in step #185, a 'flash ON interrupt' is generated after a prescribed period of time has elapsed since the start of the timer (#215).

Figure 20:
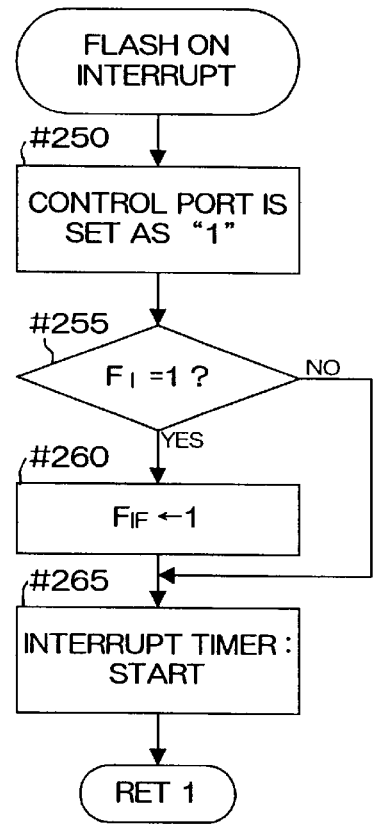
FIG. 20 is a flow chart showing the 'flash ON interrupt' subroutine.

FIG. 20 is a flow chart of the 'flash ON interrupt' subroutine. When this timer interrupt sequence occurs, the control port $P_F$ is set to '1' and flash light emission is begun (#250). It is then determined whether or not the integration period is underway, i.e., whether or not the flag $F_I$ is set to '1' (#255). If the flag $F_I$ is set to '1' (YES in #255), the flag $F_{IF}$ indicating that flash light was emitted during the integration period is set to '1' (#260), and if not (NO in #255), step #260 is skipped. The interrupt timer is then restarted for the 'flash OFF interrupt' of step #220 (#265), and this interrupt sequence is completed. If the flash light emission period elapses after the interrupt timer of step #265 is restarted, a 'flash OFF interrupt' is generated (#220).

Figure 21:
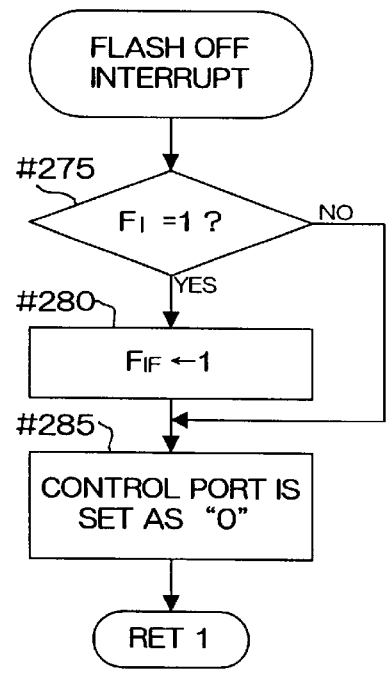
FIG. 21 is a flow chart showing the 'flash OFF interrupt' subroutine.

FIG. 21 is a flow chart of the 'flash OFF interrupt' subroutine. When this interrupt is generated, it is determined whether or not the flag $F_I$ is set to '1' (#275). If the flag $F_I$ is set to '1' (YES in #275), the flag $F_{IF}$ is set to '1' (#280), and if not (NO in #275), step #280 is skipped. The control port $P_F$ is then set to '0' and flash light emission is completed (#285), whereupon the interrupt process is completed.

Following step #185 of FIG. 19, the 'shake amount detection' subroutine of FIG. 18 is called (#190) and the processes of steps #100 through #125 are executed. It is then determined whether or not the flag $F_{IF}$ is set to '1' (#130). If the flag $F_{IF}$ is set to '1' (YES in #130), the shake amount substituting for the shake amount sought in step #125 (substitute shake amount) is calculated (#135), and if not (NO in #130), step #135 is skipped. The camera thereupon returns to the main routine.

An estimated shake amount is then sought from the obtained shake amounts, and this estimated shake amount is converted into a drive amount, whereupon a drive signal is generated. The correction lens unit 3 is driven in response to this drive signal (#195).

It is then determined whether or not the period of time that has elapsed since the timer started in step #175 has exceeded the appropriate exposure time tss (#200). If it has not (NO in #200), the camera returns to step #190. In this way, the shake amount detection and shake correction drive processes are repeated until the elapsed time exceeds the appropriate exposure time tss.

When the elapsed time exceeds the appropriate exposure time tss (YES in #200), the shutter 23 is closed (#205), and the shake correction completion process (the process in which the horizontal shake correction lens 31 and the vertical shake correction lens 32 are fixed at prescribed positions and the supply of current to the driving section 6 is stopped) is executed (#210), whereupon the processes of this flow chart are completed.

In this embodiment, where the flash unit has emitted light during the integration period, a substitute shake amount is calculated from past shake amounts, but it is acceptable to have a construction in which, where the flash unit is to emit light during the integration period, the camera sequence waits for the flash light emission to be completed and begins the next cycle.

Figure 22:
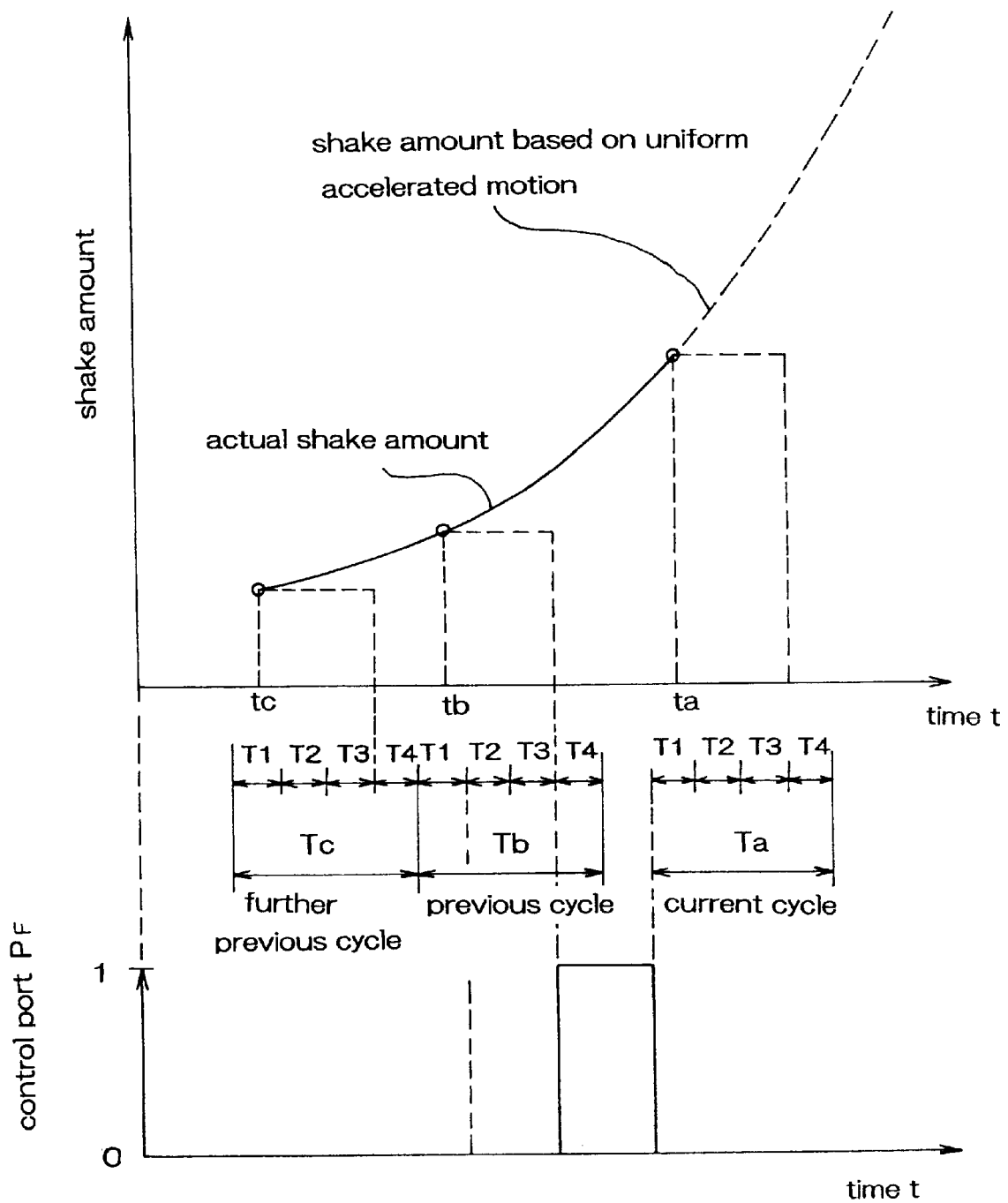
FIG. 22 is a drawing showing the manner in which the next cycle is begun after the completion of flash light emission.

FIG. 22 is a drawing showing the manner in which the camera sequence waits for the emission of flash light to be completed and begins the next cycle. In the example of FIG. 22, the integration period T1 of the current cycle Ta would be affected by the emission of flash light if integration period T1 of the current cycle Ta began immediately after the completion of the previous cycle Tb. As a result, the shake sensor controller 43 monitors the control port $P_F$ status as a means to detect the light emission status, and if it is set to '1', the shake sensor controller 43 controls, for the purpose of prohibition, the shake sensor 42 so that the next light receiving operation is begun after the control port $P_F$ status becomes '0'. The effect of the flash light emission is thus avoided, as shown in FIG. 22. In this case, the substitute shake amount calculator 511e and its related control are not necessary.

Figure 23:
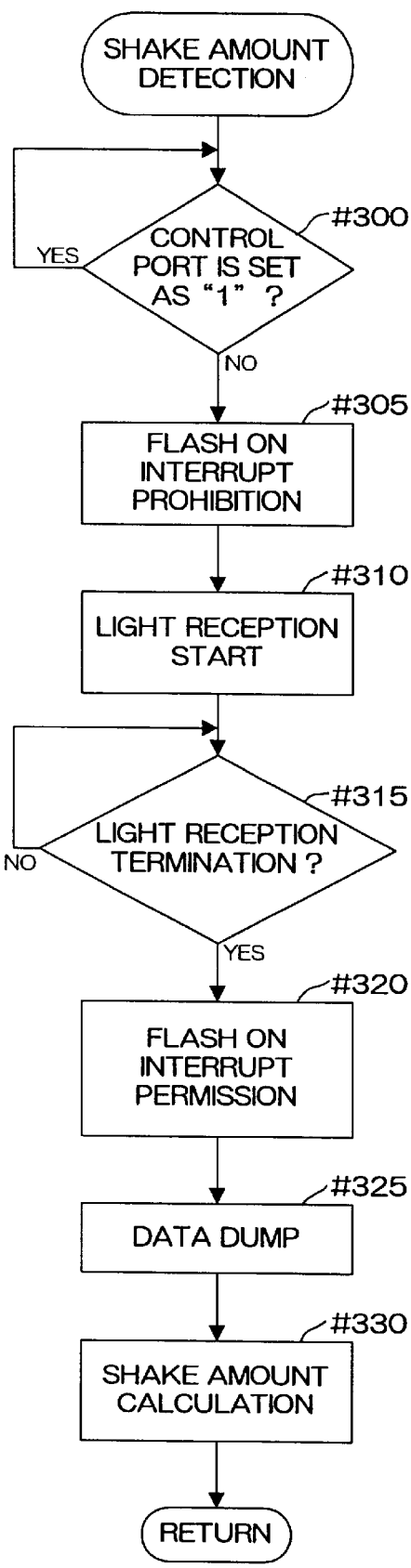
FIG. 23 is a flow chart showing the 'shake amount detection' subroutine where the shake sensor controller monitors the control port PF.

FIG. 23 is a flow chart showing the 'shake amount detection' subroutine where the shake sensor controller 43 monitors the control port $P_F$ as described above. When this subroutine is called, it is determined whether or not the control port $P_F$ status is set to '1' (#300). So long as the control port $P_F$ status is '1', this determination is repeated until the control port $P_F$ status becomes '0', i.e., until flash light emission is stopped (YES in #300).

If the status of control port $P_F$ is not '1' (NO in #300), the 'flash ON interrupt' is prohibited (#305), and the light receiving operation is begun (#310).

It is then determined in response to the presence of a light receiving completed signal whether or not the light receiving operation has been completed (#315). This determination is repeated until the light receiving completed signal is received (NO in #315). When the light receiving operation has been completed (YES in #315), the 'flash ON interrupt' is permitted (#320). After the image signal obtained in the light receiving operation by the shake sensor 42 is converted into image data by the signal processor, it is dumped into the memory 56 (#325), and the shake amount is sought (#330). Driving of the correction lens unit 3 is thereby enabled using a shake amount that is not affected by the emission of flash light.

The implementation of the present invention is not limited to this embodiment. It is acceptable if the shake amount calculator 511 monitors the status of the control port $P_F$ for detecting the light emission status, and if flash light has been emitted during the integration period, seeks, for the purpose of prohibition, the shake amount using only image data obtained during the integration period during which flash light has not been emitted, without using the image data obtained during the integration period during which flash light has been emitted.

It is also acceptable if the flash controller 84 detects, to detect the shake detection status, whether or not shake detection by the shake detection section 4 is underway, and if shake detection is underway, prohibits the light emitting operation by the flash light emitter 83.

Where the shake detector comprises an angular speed sensor, the power source conditions worsen when flash light is being emitted. Therefore, highly reliable shake detection may be performed in the same manner as described above by not using the shake detection results obtained during flash light emission.

Where the shake amount detector 51 seeks the shake amount to be displayed on the shake amount display section 12, it is acceptable if the base image is updated. In this case, the correction lens unit 3 is not driven because shake correction is not performed. Therefore, where the reference image positions that are sequentially detected stop changing after deviating from the standard image position, if a reference image position detected after the reference image positions stop changing deviates from the standard image position, the shake amount is detected even though it did not change from the previous reference image position. If the standard image is updated and replaced with the image data immediately prior to the latest image data, for example, such the shake amount will not be detected and the shake amount that corresponds to the actual degree of instability can be obtained at all times.

As is clear from the above discussion, using the construction described above, the expected negative impact of flash light emission is avoided, and appropriate shake detection or shake correction may be performed.

In addition, using the construction described above, erroneous shake detection caused by flash light emission can be prevented.

Further, using the construction described above, appropriate shake correction can be performed regardless of whether erroneous detection occurs due to flash light emission.

Moreover, using the above construction, appropriate shake detection can be performed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera comprising:
   a shake detector that detects movement of the camera relative to an object to be photographed;
   an electronic flash unit that emits flash light; and
   a correction controller that performs shake correction based on the results of the detection by said shake detector, said correction controller performs the control such that the results of the detection performed by the shake detector during light emission by said electronic flash unit are not reflected in the shake correction.

2. A camera according to claim 1, wherein detection by said shake detector during light emission by said electronic flash unit is prohibited.

3. A camera according to claim 1, wherein the results of the detection performed during light emission by the electronic flash unit is prohibited from being used for shake correction.

4. A camera according to claim 1, wherein said electronic flash unit is built in said camera.

5. A camera comprising:
   a shake detector that detects movement of the camera relative to an object to be photographed;
   an electronic flash unit that emits flash light; and
   a correction controller that performs shake correction based on the results of the detection by said shake detector, said correction controller performs the control such that light emission from the electronic flash unit is delayed so that light emission will not occur during shake detection performed by said shake detector.

6. A camera according to claim 5, wherein said electronic flash unit is built in said camera.

7. A camera comprising:
   a shake detector that detects movement of the camera relative to an object to be photographed;
   an electronic flash unit that emits flash light;
   an emission detector that detects whether or not flash light is being emitted from said electronic flash unit; and
   a correction controller which performs control such that shake detection by the shake detector is prohibited while said emission detector detects that flash light is being emitted by said electronic flash unit.

8. A camera according to claim 7, wherein said electronic flash unit is built in said camera.

9. A camera comprising:
   a shake detector that detects movement of the camera relative to an object to be photographed;
   an electronic flash unit that emits flash light;
   an emission detector that detects whether or not flash light is being emitted from said electronic flash unit; and
   a correction controller which performs shake correction such that the results of the detection performed during light emission by the electronic flash unit is prohibited from being used for shake correction in response to the detection result of said emission detector.

10. A camera according to claim 9, wherein said electronic flash unit is built in said camera.

11. A camera comprising:
    a shake detector that detects movement of the camera relative to an object to be photographed;
    an electronic flash unit that emits flash light;
    a shake detection status detector that detects whether or not shake detection is being performed by said shake detector; and
    a correction controller which performs shake correction such that emission of flash light by said electronic flash unit takes place after the completion of the shake detection by said shake detector.

12. A camera according to claim 11, wherein said electronic flash unit is built in said came.

* * * * *

UNITED STATES PATENT AND TRADEMARK OFFICE
CERTIFICATE OF CORRECTION

PATENT NO. : 5,966,549
DATED : October 12, 1999
INVENTOR(S) : Yoshihiro HARA et al.

It is certified that error appears in the above-identified patent and that said Letters Patent is hereby corrected as shown below:

Column 19, line 58, after "correction", insert --control--.

Column 19, line 60, after "detector", insert --wherein--.

Column 19, line 60, after "the", insert --shake correction--.

Column 19, line 63, delete "the" and insert --a--.

Column 20, line 7, delete "is" and insert --are--.

Column 20, line 15, after "correction", insert --control--.

Column 20, line 17, after "detector", insert --wherein--.

Column 20, line 17, after "the", insert --shake correction--.

Column 20, line 20, delete "shake" and insert --movement--.

Column 20, line 31, delete "shake" and insert --movement--.

Column 20, line 42, after "correction", insert --control--.

Column 20, line 43, after "detection", insert --by the shake detector of movement of the camera--.

UNITED STATES PATENT AND TRADEMARK OFFICE
CERTIFICATE OF CORRECTION

PATENT NO. : 5,966,549
DATED : October 12, 1999
INVENTOR(S) : Yoshihiro HARA et al.

It is certified that error appears in the above-identified patent and that said Letters Patent is hereby corrected as shown below:

Column 20, line 55, delete "shake" and insert --movement--.

Column 20, line 57, after "correction", insert --control--.

Column 20, line 59, delete "shake" and insert --movement--.

Signed and Sealed this

Ninth Day of January, 2001

*Attest:*

Q. TODD DICKINSON

*Attesting Officer*    *Commissioner of Patents and Trademarks*